United States Patent
Takamiya

(10) Patent No.: US 10,338,859 B2
(45) Date of Patent: Jul. 2, 2019

(54) RECORDING CONTROL APPARATUS AND CONTROL METHOD THEREOF, AS WELL AS IMAGING APPARATUS, INFORMATION PROCESSING APPARATUS, AND RECORDING SYSTEM

(71) Applicant: CANON KABUSHIKI KAISHA, Tokyo (JP)

(72) Inventor: Hideaki Takamiya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/986,268

(22) Filed: May 22, 2018

(65) Prior Publication Data

US 2018/0341439 A1 Nov. 29, 2018

(30) Foreign Application Priority Data

May 24, 2017 (JP) .................. 2017-102958

(51) Int. Cl.
| | |
|---|---|
| H04N 1/04 | (2006.01) |
| G06F 3/12 | (2006.01) |
| H04N 5/357 | (2011.01) |
| G06T 7/571 | (2017.01) |
| H04N 1/405 | (2006.01) |

(52) U.S. Cl.
CPC .......... *G06F 3/1208* (2013.01); *G06F 3/1252* (2013.01); *G06T 7/571* (2017.01); *H04N 1/405* (2013.01); *H04N 1/4051* (2013.01); *H04N 5/357* (2013.01)

(58) Field of Classification Search
CPC ...... G06F 3/1208; G06F 3/1252; H04N 5/357
USPC .................................. 358/1.2, 3.06
See application file for complete search history.

(56) References Cited

U.S. PATENT DOCUMENTS

2006/0170986 A1* 8/2006 Iriyama ............... H04N 1/4058
358/474

FOREIGN PATENT DOCUMENTS

JP 2005340940 A 12/2005

* cited by examiner

*Primary Examiner* — Houshang Safaipour
(74) *Attorney, Agent, or Firm* — Carter, DeLuca & Farrell LLP

(57) ABSTRACT

A recording control apparatus for recording a captured image obtains an image to be recorded and analysis information based on a distance to an object in each portion of the image. When causing a recording control unit to execute recording of the image, the recording control apparatus selects, on the basis of a value of each pixel of the image and the analysis information, a dot layout pattern that is used to record each pixel of the image and that indicates a layout of recorded dots included in dots constituting the pixel.

18 Claims, 13 Drawing Sheets

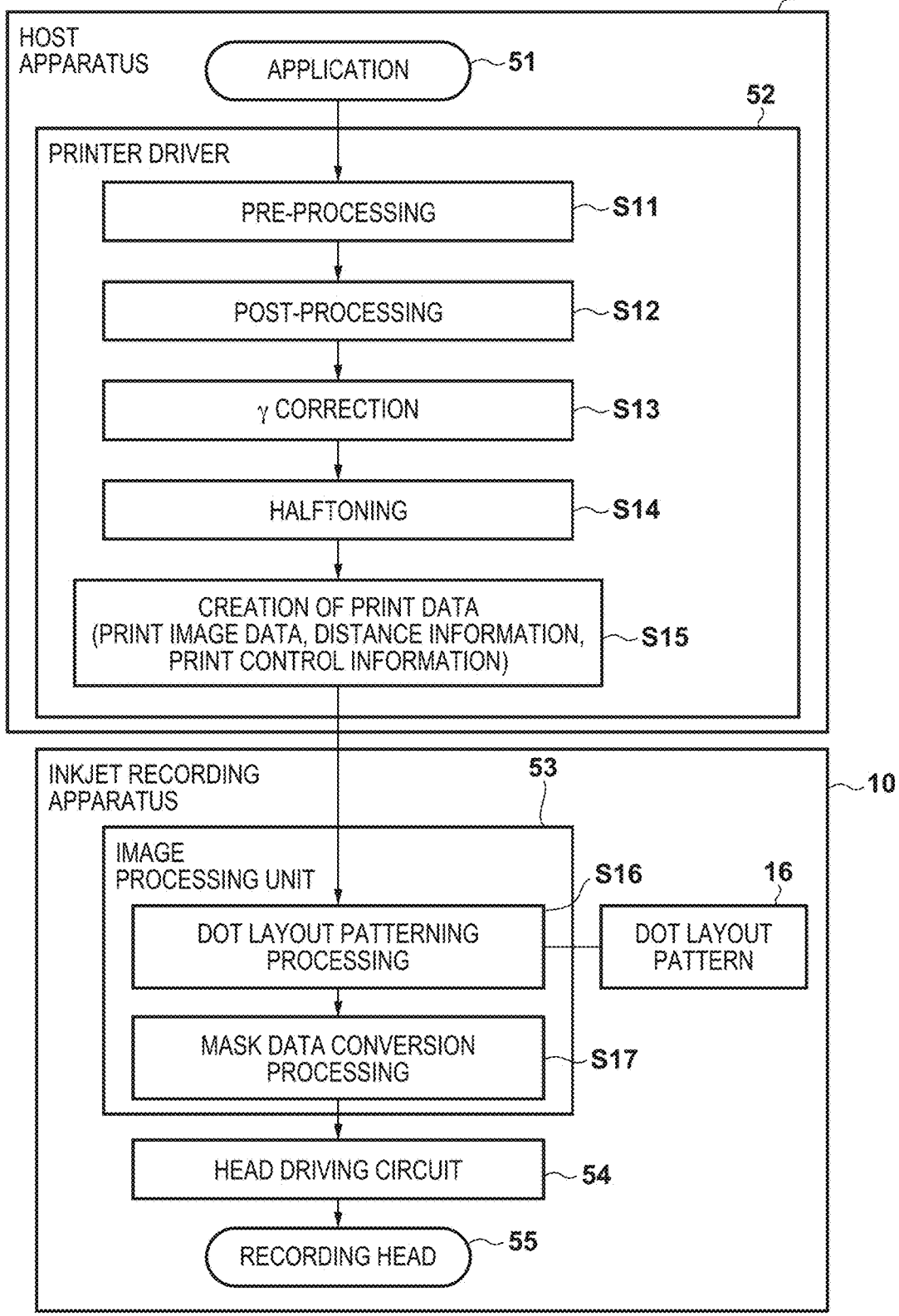

FIG. 5A
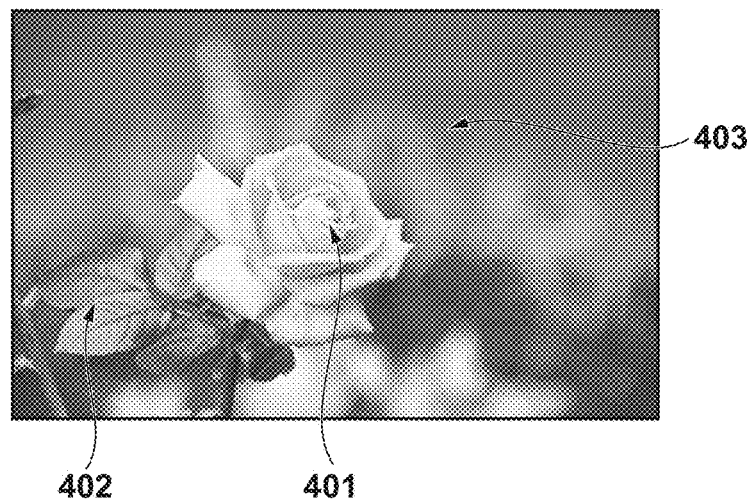
FIG. 5B
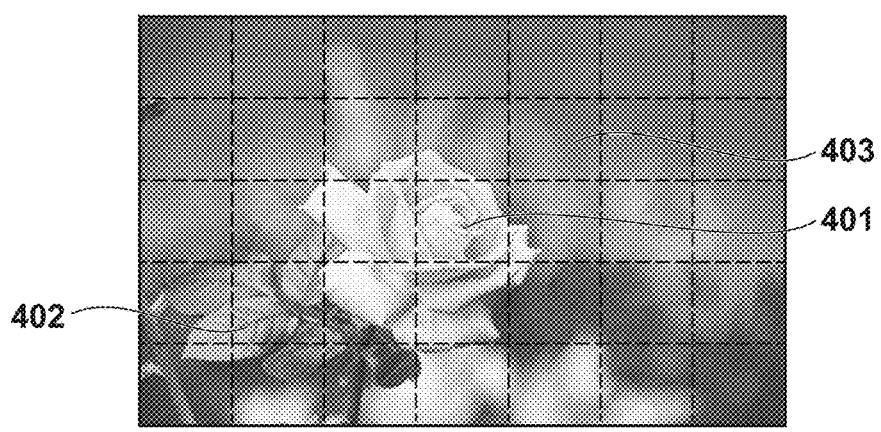
FIG. 5C
| ∞ | ∞ | ∞ | ∞ | ∞ | ∞ | ∞ |
|---|---|---|---|---|---|---|
| ∞ | ∞ | ∞ | ∞ | ∞ | ∞ | ∞ |
| ∞ | ∞ | 0.5 | 0.5 | ∞ | ∞ | ∞ |
| 0.6 | 0.6 | 0.5 | 0.5 | 1.2 | 1.2 | 1.2 |
| 1.2 | 1.2 | 0.6 | 0.6 | 1.2 | 1.2 | 1.2 |

PLAN VIEW a-a CROSS-SECTIONAL VIEW

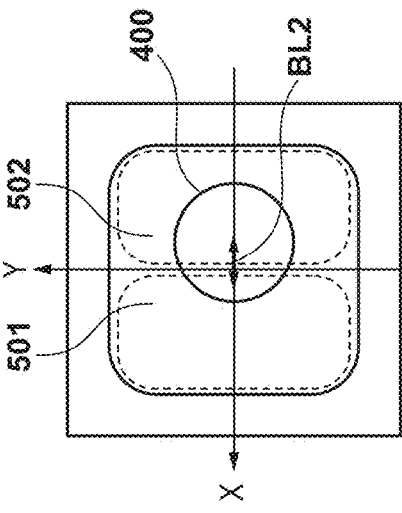 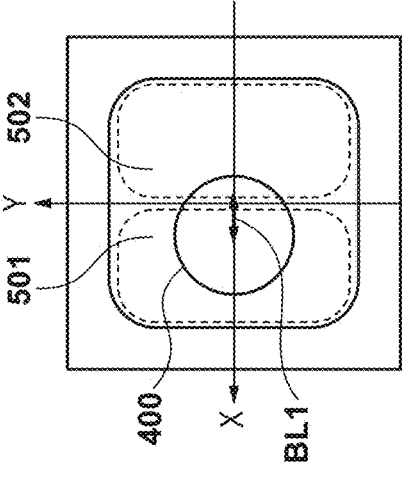 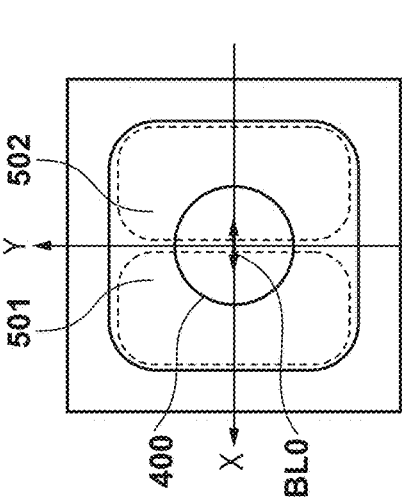
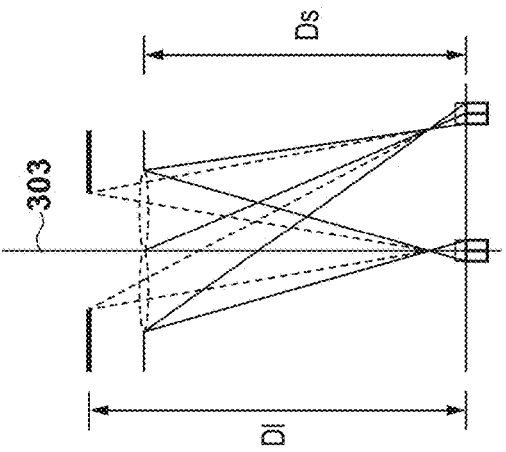 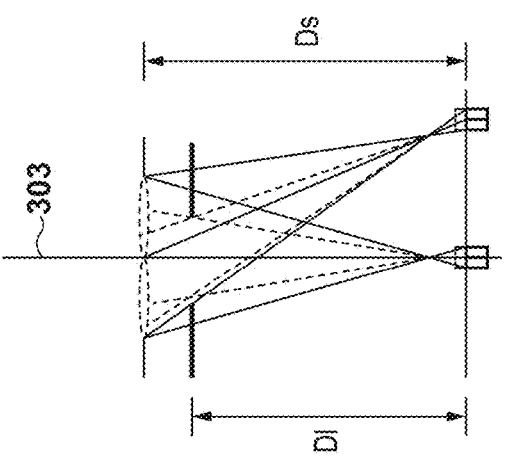 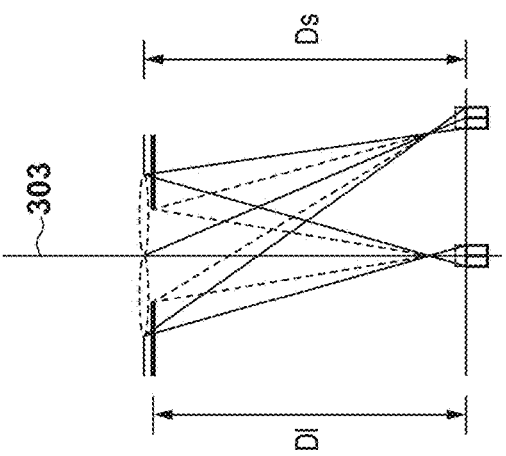
FIG. 13A   FIG. 13B   FIG. 13C

FIG. 14A
| DEFOCUS AMOUNT | 0~0.5mm | 0.5~2mm | 2~5mm | ≥ 5mm |
|---|---|---|---|---|
| DOT ADJACENCY PROBABILITY | 100% | 50% | 25% | 0% |
FIG. 14B
| | | | | | | |
|---|---|---|---|---|---|---|
| ≥ 5.0 | ≥ 5.0 | ≥ 5.0 | ≥ 5.0 | ≥ 5.0 | ≥ 5.0 | ≥ 5.0 |
| ≥ 5.0 | ≥ 5.0 | ≥ 5.0 | ≥ 5.0 | ≥ 5.0 | ≥ 5.0 | ≥ 5.0 |
| ≥ 5.0 | ≥ 5.0 | 0.0 | 0.1 | ≥ 5.0 | ≥ 5.0 | ≥ 5.0 |
| 2.2 | 1.5 | 0.1 | 0.2 | 3.0 | 3.0 | 3.0 |
| 3.0 | 4.0 | 1.5 | 1.5 | 3.0 | 3.0 | 3.0 |
FIG. 15A
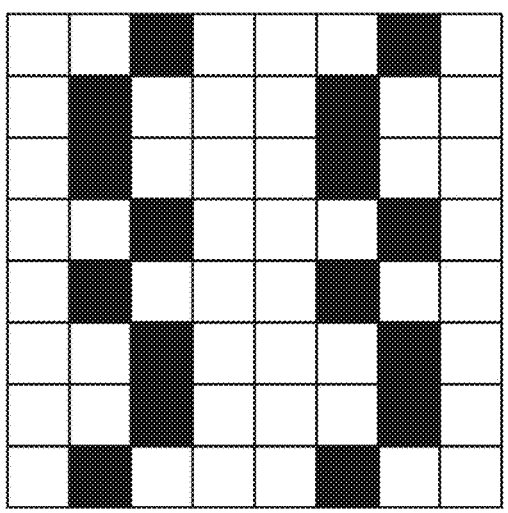
FIG. 15B
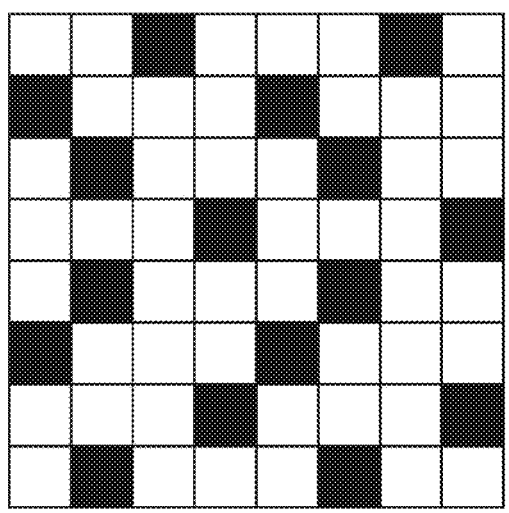

RECORDING CONTROL APPARATUS AND CONTROL METHOD THEREOF, AS WELL AS IMAGING APPARATUS, INFORMATION PROCESSING APPARATUS, AND RECORDING SYSTEM

BACKGROUND OF THE INVENTION

Field of the Invention

The present invention relates to a recording control apparatus and a control method thereof, as well as an imaging apparatus, an information processing apparatus, and a recording system.

Description of the Related Art

There have been an increasing number of opportunities to record images shot by an imaging apparatus such as a digital camera by using a recording apparatus such as an inkjet recording apparatus. In such recording of a shot image, high-resolution recording is required for an image containing high-frequency components such as an object in focus in the shot image. On the other hand, high resolution is not required for a blurred region, which is out of focus, in the shot image and an image with few high-frequency components. Rather, there are cases where highly robust recording is required to absorb a degradation in image quality caused by mechanical variations of the recording apparatus.

To achieve the above-described recording method, Japanese Patent Laid-Open No. 2005-340940 (hereinafter referred to as "Document 1") extracts the space frequency of input image data or a feature amount corresponding thereto, and executes recording after determining the dot layout on the basis of the extracted feature amount.

However, with the method described in Document 1, the control of the dot layout cannot be successfully carried out, for example, if the feature amount of the image cannot be correctly extracted. Accordingly, recording with the required resolution cannot be performed, or streaks and unevenness become noticeable, resulting in a deterioration in the quality of the recorded image.

SUMMARY OF THE INVENTION

According to an embodiment of the present invention, a recording control apparatus that enables more reliably selection of a dot layout pattern suitable for each region in a shot image, and a control method thereof, as well as an imaging apparatus, an information processing apparatus, and a recording system are provided.

According to one aspect of the present invention, there is provided a recording control apparatus for recording a captured image, comprising: an obtaining unit configured to obtain an image to be recorded and analysis information based on a distance to an object in each portion of the image; a recording control unit configured to execute recording of the image; and a selecting unit configured to select, on the basis of a value of each pixel of the image and the analysis information, a dot layout pattern that is used to record each pixel of the image and that indicates a layout of recorded dots included in dots constituting the pixel.

According to another aspect of the present invention, there is provided an imaging apparatus comprising: an image sensor including pixels including a first focus detection pixel and a second focus detection pixel; an obtaining unit configured to obtain an image captured using the image sensor, a first focus detection signal from the first focus detection pixel, and a second focus detection signal from the second focus detection pixel; a generation unit configured to generate, on the basis of the first and second focus detection signals, analysis information based on a distance to an object in each portion of the image captured with the image sensor; and an output unit configured to output the image and the analysis information in association with each other.

According to another aspect of the present invention, there is provided an information processing apparatus comprising: an obtaining unit configured to obtain an image captured using an image sensor including an imaging pixel in which a first focus detection pixel and a second focus detection pixel are formed in one pixel, and a parallax image associated with the captured image, the parallax image including an image obtained from the first and second focus detection pixels; a generation unit configured to generate tone value information for causing a recording apparatus to record the image; a calculating unit configured to calculate, on the basis of the parallax image, analysis information based on a distance to an object in each portion of the image; and an output unit configured to output the tone value information and the analysis information to the recording apparatus.

According to another aspect of the present invention, there is provided a recording system including an imaging apparatus, an information processing apparatus, and a recording apparatus, the system comprising: an imaging unit configured to capture an image in the imaging apparatus; an obtaining unit configured to obtain a parallax image during capturing of the image in the imaging apparatus; a generation unit configured to generate, in the information processing apparatus, tone value information for causing the recording apparatus to record the image; a recording unit configured to execute recording of the image in the recording apparatus; a calculating unit configured to calculate, in one of the imaging apparatus, the information processing apparatus, and the recording apparatus, analysis information based on a distance to an object in each portion of the image, on the basis of the parallax image; and a selecting unit configured to select, in one of the information processing apparatus and the recording apparatus, a dot layout pattern that is used to record each pixel of the image on the basis of the tone value information and the analysis information during recording of the image by the recording unit and that indicates a layout of recorded dots included in dots constituting the pixel.

According to another aspect of the present invention, there is provided a control method of a recording apparatus that records a captured image, comprising: obtaining an image to be recorded, and analysis information based on a distance to an object in each portion of the image; executing recording of the image by using a recording unit; and selecting, on the basis of a value of each pixel of the image and the analysis information, a dot layout pattern that is used to record each pixel of the image and that indicates a layout of recorded dots included in dots constituting the pixel.

Further features of the present invention will become apparent from the following description of exemplary embodiments (with reference to the attached drawings).

BRIEF DESCRIPTION OF THE DRAWINGS

FIG. 3 shows recording processing performed by the host apparatus and the inkjet recording apparatus.

FIG. 5A shows an example of a shot image that is to be recorded.

FIGS. 5B and 5C show an example of a distance map corresponding to the shot image.

FIGS. 13A to 13C are schematic diagrams of pupil shift of the first focus detection signal and the second focus detection signal in the embodiment.

FIG. 14A illustrates selection of dot layout patterns according to an embodiment.

FIG. 14B shows an example of a distance map in which defocus amounts are used as analysis information.

FIGS. 15A and 15B show variations of dot layouts from a vertical line.

DESCRIPTION OF THE EMBODIMENTS

Hereinafter, embodiments of the present invention will be described in detail on the basis of the accompanying drawings. An embodiment provides a capturing and recording system capable of performing recording in accordance with the required resolution of a shot image.

First Embodiment

Figure 1A:
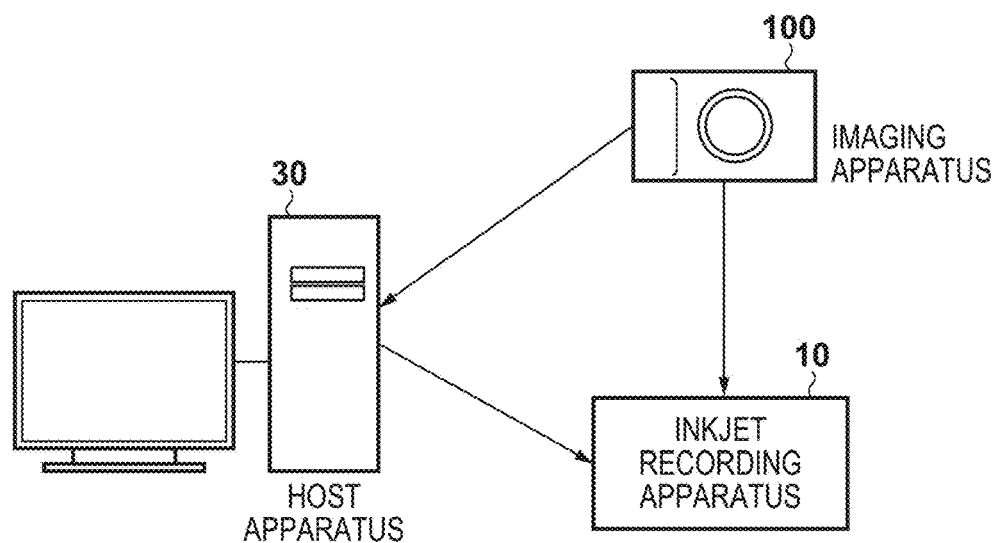
FIG. 1A shows an exemplary configuration of a recording system.

FIG. 1A shows an exemplary schematic configuration of an image recording system according to an embodiment. The image recording system of the embodiment includes an inkjet recording apparatus 10, a host apparatus 30, and an imaging apparatus 100. The imaging apparatus 100 generates analysis information together with a shot image during image shooting, and provides the analysis information to the host apparatus 30. The analysis information includes information corresponding to a distance to, for example, an object in each portion (each region) of an image. The details of the analysis information will be described later. The host apparatus 30 generates recording data for recording the shot image in the inkjet recording apparatus 10, and provides the recording data together with the analysis information to the inkjet recording apparatus 10. The inkjet recording apparatus 10 records the shot image by executing recording on the basis of the recording data. At this time, the inkjet recording apparatus 10 records the shot image while selecting and switching a dot layout pattern on the basis of the density of each pixel indicated by recording image data and the analysis information. The dot layout pattern is a pattern that is used to record each pixel of an image and that indicates a layout of recorded dots included in the dots constituting the pixel.

Although, in the embodiment, the imaging apparatus 100 provides the shot image and the analysis information to the host apparatus 30, and the host apparatus 30 transmits the recording data to the inkjet recording apparatus 10, the present invention is not limited thereto. For example, the imaging apparatus 100 may be configured to have the function of the host apparatus 30 such that the imaging apparatus 100 transmits the recording data to the inkjet recording apparatus 10. In the following, a configuration in which communication between the imaging apparatus 100, the host apparatus 30, and the inkjet recording apparatus 10 is implemented via a network. However, the present invention is not limited thereto. For communication, for example, an USB may be used, or either a wired or wireless communication may be used.

Figure 1B:
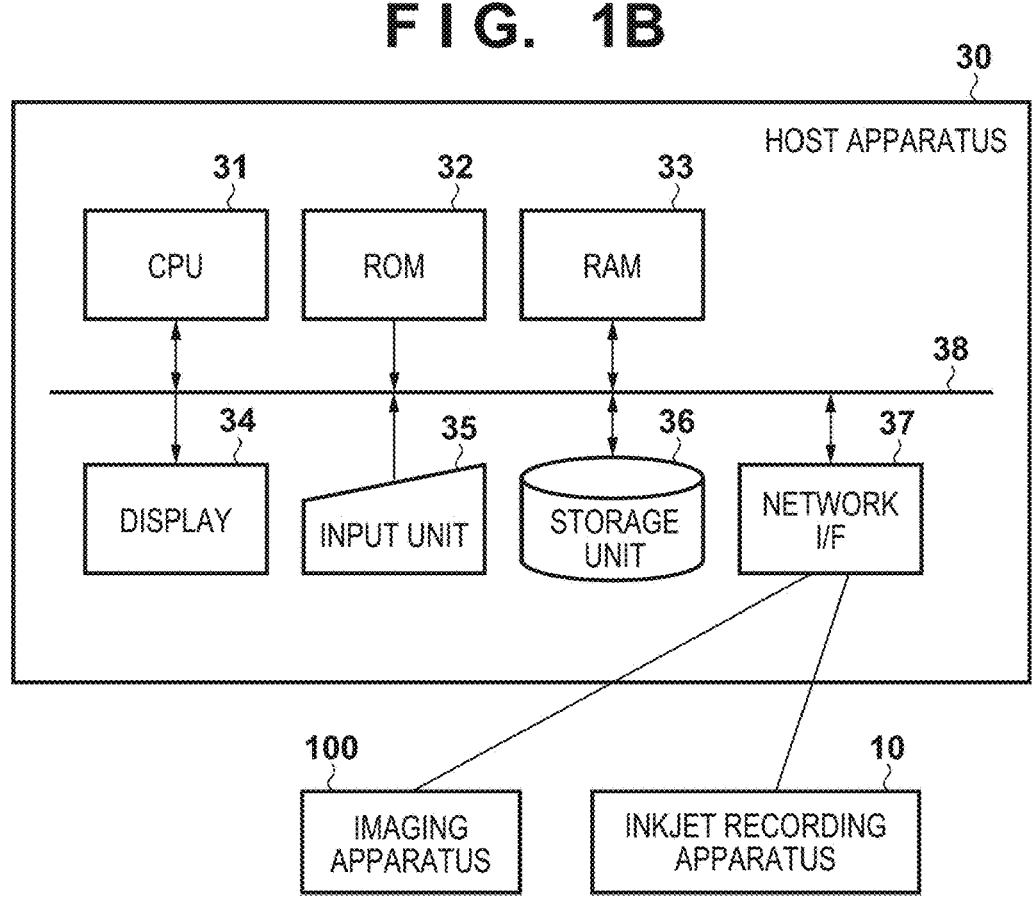
FIG. 1B is a block diagram showing an exemplary hardware configuration of a host apparatus.

FIG. 1B is a block diagram showing an exemplary hardware configuration of the host apparatus 30. A CPU 31 implements various types of processing by executing a program stored in a ROM 32 or a RAM 33. The ROM 32 is a read-only non-volatile memory, and the RAM 33 is a volatile memory that is readable and writable as needed. Note that the memory configuration is not limited thereto. A display 34 performs various types of displays under control of the CPU 31. An input unit 35 is, for example, a keyboard and/or a pointing device, and enables the user to make operational inputs. A storage unit 36 is a mass storage medium constituted by a hard disk, for example. A network interface 37 connects to a network to enable communication with an external device. In the present embodiment, communication between the imaging apparatus 100 and the inkjet recording apparatus 10 is established via the network interface 37. A bus 38 connects the above-described parts so as to be communicable with each other.

Figures 2A, 2B:
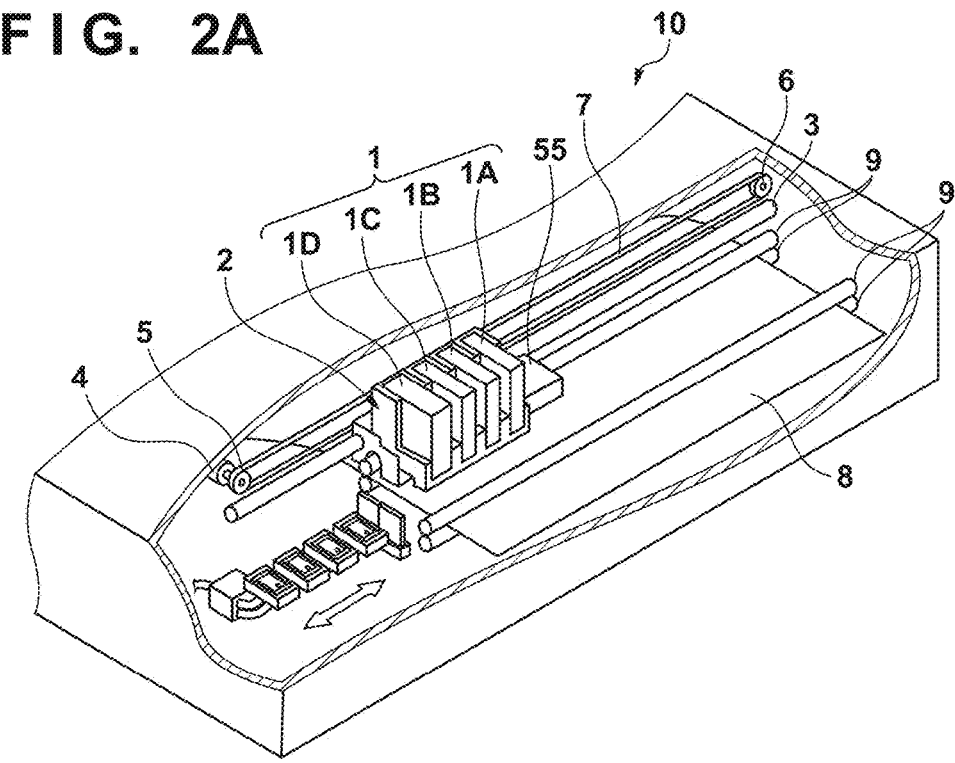
FIG. 2A is a perspective view of an inkjet recording apparatus.
FIG. 2B is a block diagram showing an exemplary control configuration of an inkjet recording apparatus.

Next, an inkjet recording apparatus 10 of the present embodiment will be described. FIG. 2A is a perspective view of the inkjet recording apparatus 10 according to the present embodiment. The inkjet recording apparatus 10 includes a carriage 2 on which a recording head 55 and a head cartridge 1 composed of ink tanks 1A to 1D and the like are mounted. A carriage motor 4 rotates a pulley 5 to drive a belt 7 wound around the pulley 5 and a pulley 6. The driving of the carriage motor 4 causes the carriage 2 attached to the belt 7 to be scanned along a guide shaft 3 in a fixed direction. During this scanning, ink droplets are ejected from the recording head 55, thus performing recording. Each time the carriage 2 performs one scan, a conveying roller 9 conveys a recording medium 8 by a predetermined amount in a direction perpendicular to the scanning direction of the carriage. In this manner, by alternately repeating the recording operation for the recording head 55 and the conveying operation for the recording medium 8, an image is formed on the entire recording medium 8.

FIG. 2B is a block diagram showing an exemplary control configuration of the inkjet recording apparatus 10. Note that although a single function inkjet recording apparatus is described in the present embodiment, it is possible to employ a so-called MFP (Multi-Function Peripheral) in which a plurality of functions such as a copy function and a reading function, in addition to the recording function, are integrated. A control unit 11 that controls recording includes a CPU 12, a ROM 13, and RAM 14, and executes various functions by performing overall control of the inkjet recording apparatus 10. The control unit 11 includes an image processing unit 53 that executes image processing on image data in accordance with each function. In addition, the control unit 11 controls recording via an image output unit 15. The image output unit 15 includes the recording head 55 and a head driving circuit 54 for driving the recording head 55, and records an image into the recording medium 8 by an inkjet recording method.

A storage unit 16 is a hard disk, for example. The storage unit 16 and the ROM 13 store an OS, an application program, data, and the like for allowing the imaging apparatus 100 to operate. The operations in the embodiment are implemented, for example, by the CPU 12 reading out a program stored in the storage unit 16 or the ROM 13 to the RAM 14 and executing the program. Note that the image processing unit 53 may be implemented by the CPU 12 executing a predetermined program, or may be implemented by dedicated hardware, or may be implemented by software and hardware that work cooperatively.

A transmitting/receiving unit 17 enables communication with the host apparatus 30 and the imaging apparatus 100 via a network (not shown) such as a LAN. For example, the recording function of the inkjet recording apparatus 10 is executed by the transmitting/receiving unit 17 receiving a recording job from the host apparatus 30 and the control unit 11 executing the recording job. Note that the transmitting/receiving unit 17 has a configuration in accordance with a communication mode of the network such as a wired communication, a wireless communication, and a short distance wireless communication.

FIG. 3 is a diagram illustrating an image forming operation performed by the inkjet recording apparatus 10 and the host apparatus 30. An application 51 and a printer driver 52 are programs operating on the operating system of the host apparatus 30. The application 51 creates recording data for recording image data with a printer. This image data or data before being subjected to editing or the like as image data can be loaded into the host apparatus 30 via various types of media. The host apparatus 30 can load image data in a JPEG format, for example, that has been captured by the imaging apparatus 100 (digital camera) from a flash memory or the like. The host apparatus 30 can also load image data stored in an external storage medium such as a hard disk (HD) or a CD-ROM. Furthermore, the host apparatus 30 can load image data on the web from the Internet. When a recording instruction is given by the application 51, recording data for image data to be recorded in accordance with the instruction is passed to the printer driver 52. Note that the recording data of the present embodiment includes recording image data and analysis information.

The printer driver 52 for performing recording control for the inkjet recording apparatus 10 performs various types of processing such as pre-processing (S11), post-processing (S12), γ correction (S13), halftoning (S14), and recording data creation processing (S15). The printer driver 52 is implemented by the CPU 31 executing a program stored in the ROM 32 or the RAM 33. In pre-processing (S11), the printer driver 52 performs mapping of color gamut (Gamut). In pre-processing, the three-dimensional LUT including, as its content, a relationship by which the color gamut reproduced by an image data R (red), G (green), and B (blue) compliant with the sRGB standard is mapped in the color gamut reproduced by the inkjet recording apparatus is used, for example. The printer driver 52 performs data conversion for converting 8-bit image data R, G, and B into data R, G, and B within the color gamut of the inkjet recording apparatus 10 by using an interpolation operation and a reference to the three-dimensional LUT in combination. In post-processing (S12), on the basis of the data R, G, and B for which the above-described color gamut has been mapped, the printer driver 52 performs processing for obtaining color separation data corresponding to the combination of inks (e.g., Y, M, C, K) that reproduces the colors represented by the data. In the present embodiment, this processing is performed using the three-dimensional LUT and an interpolation operation in combination, as in the pre-processing. Here, Y denotes yellow, M denotes magenta, C denotes cyan, and K denotes black.

In γ correction (S13), the printer driver 52 performs tone value conversion for each color data of the color separation data obtained by the post-processing (S12). Specifically, a conversion by which the color separation data is linearly associated with the tone characteristics of the inkjet recording apparatus 10 is performed by using one dimensional LUT corresponding to the tone characteristic of each color ink of the inkjet recording apparatus 10.

In halftoning (S14), the printer driver 52 performs bit reduction, for example, by using error diffusion for each of the 8-bit color separation data Y, M, C, and K, for example. In the present embodiment, quantization for converting 8-bit data (256 tones) into 3-bit data (5 levels) is performed. The 3-bit data is data (referred to as "tone value information") serving as an index for indicating the dot layout pattern in the patterning processing of the dot layout in the inkjet recording apparatus 10. Which one of five levels of coverage ratios of the dot layout pattern shown in FIG. 4, which will be discussed later, is determined in accordance with the tone value information. Finally, in recording data creation processing (S15), the printer driver 52 creates recording data in which the recording control information and analysis information, which will be described later, are added to recording image data including the above-described 3-bit index data as its content.

The inkjet recording apparatus 10 (image processing unit 53) performs dot layout patterning processing (S16) and mask data conversion processing (S17) for the recording data received from the host apparatus 30 (printer driver 52). In the dot layout patterning processing, a dot layout pattern used to record each pixel of an image to be recorded is selected on the basis of the value of the pixel of the image and the analysis information. The dot layout pattern is a pattern indicating the layout of recorded dots included in the dots constituting a pixel. In the present embodiment, a plurality of types of dot layout patterns exist for one density of a pixel. From a plurality of types of dot layout patterns of a density corresponding to the value of a pixel, a dot layout pattern used to record the pixel is selected on the basis of the analysis information on a portion to which the pixel belongs.

In dot layout patterning processing (S16), the image processing unit 53 performs dot layout in accordance with the dot layout pattern corresponding to 3-bit index data (tone value information) serving as recording image data and analysis information for each of the pixels corresponding to an actual recorded image. At this time, the image processing unit 53 selects, on the basis of the analysis information and the index data included in the recording data, the dot layout pattern used to record the pixel from the dot layout patterns (described later with reference to FIG. 4) stored in the storage unit 16. In this manner, in the dot layout patterning processing, for each pixel represented by 3-bit data (5 levels), the dot layout pattern corresponding of the tone value of the pixel is assigned, and the dot on/off is defined for each of a plurality of areas in the pixel. Through this processing, ejection data indicating the presence or absence of recording ("1" or "0") of each of the dots constituting one pixel is disposed, and the ejection data serves as information that can be used in the inkjet recording apparatus 10 that forms images by ink ejection.

The 1-bit ejection data obtained in the above-described manner is subjected to mask processing in mask data conversion processing (S17). That is, the image processing unit 53 generates the ejection data for each scanning to record an image by scanning a scanning region having a predetermined width once or a plurality of times using the recording head 55 by processing using a mask corresponding to each scanning. The ejection data Y, M, C, and K for each scanning is sent to the head driving circuit 54 at appropriate timing, and thereby, the recording head 55 is driven, and each ink is ejected in accordance with the ejection data.

Although a configuration in which the dot layout patterning processing (S16) and the mask data conversion processing (S17) are executed in the inkjet recording apparatus 10 is described, the present invention is not limited thereto. For example, part or all of the dot layout patterning processing (S16) and the mask data conversion processing (S17) may be executed by the host apparatus 30 (printer driver 52). Alternatively, part of the processing of the printer driver 52, such as the halftoning (S14), may be executed by the inkjet recording apparatus 10 (image processing unit 53).

Next, the dot layout patterning processing (S16) will be described. In the above-described halftoning (S14), the number of levels of the 256-value multi-value density information (8-bit data) is reduced to 5-value tone value information (3-bit data). However, the information that can be recorded with the recording head 55 of the inkjet recording apparatus 10 is binary information indicating whether or not to record inks. In the dot layout patterning processing (S16), processing for reducing a multi-value level of 3 values or more (in the present example, 5 values of 0 to 4 (3 bits)) to a binary level determining the presence or absence of a dot is executed. Specifically, in the dot layout patterning processing (S16), for each pixel represented by 3-bit data of levels 0 to 4, which are output values obtained from halftoning (S14), a dot layout pattern at a coverage ratio corresponding to the tone value (levels 0 to 4) of the pixel is assigned. Consequently, on/off is defined for each of a plurality of dots recorded by scanning of one pixel, and 1-bit ejection data of "1" or "0" is provided for each of the dots included in one pixel.

Figure 4:
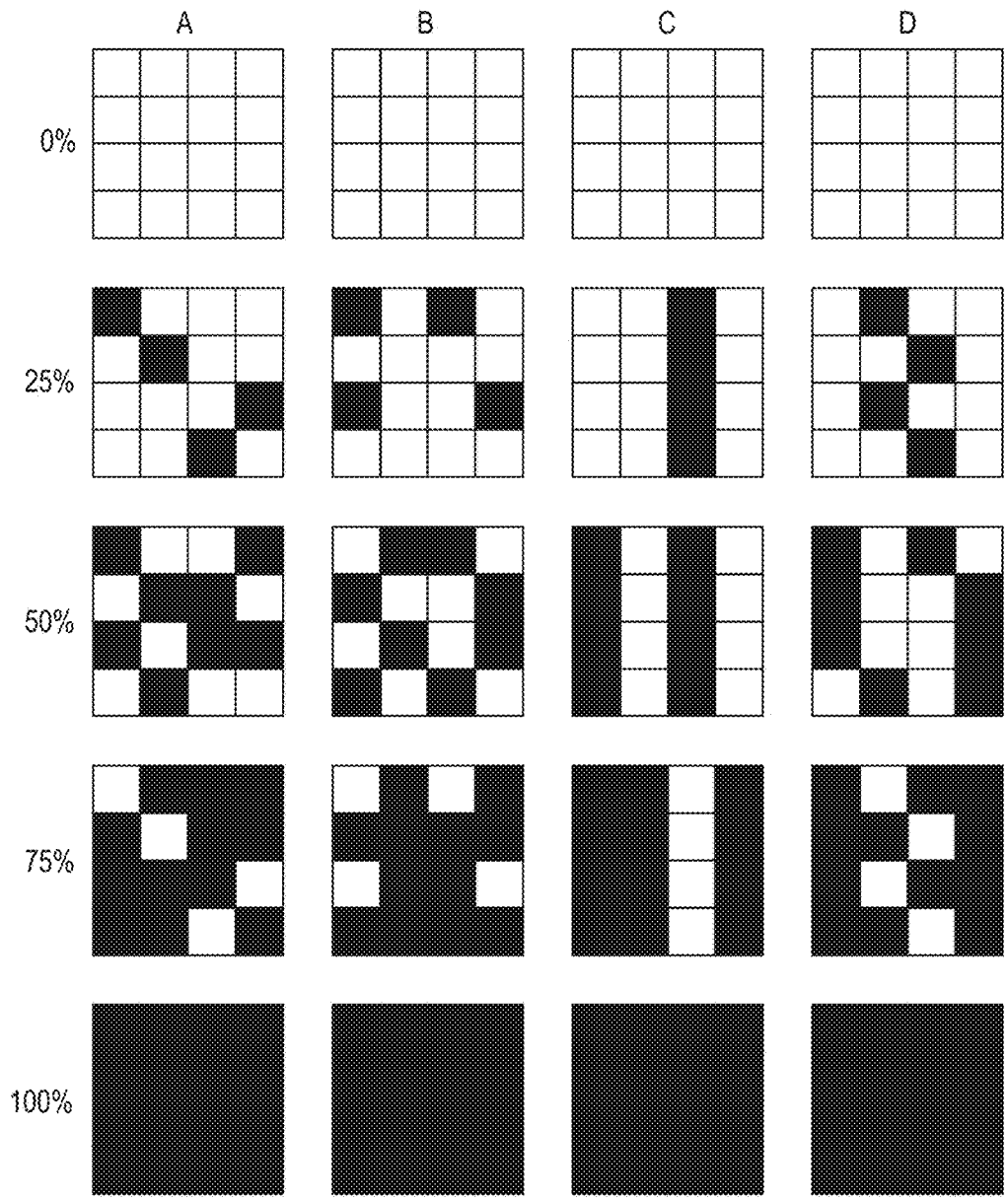
FIG. 4 shows examples of dot layout patterns used in the embodiment.

FIG. 4 shows examples of dot layout patterns used in the dot layout patterning processing of the present embodiment. At the time of converting a multi-value input image into area gradation according to the presence/absence of ink droplets, the inkjet recording apparatus 10 uses dot layout patterns as illustrated in FIG. 4. FIG. 4 shows to which of the cells arranged in a 4×4 square matrix the ink droplets are to be ejected at each of the levels (coverage ratios) of 0 to 4. For example, four types, namely, A to D, of dot layout patterns representing the same coverage ratio (level 1) of 25% are provided. Likewise, a plurality of patterns are provided for each of the coverage ratios of 50%, 75% (levels 2, 3), and so forth.

In the inkjet recording apparatus 10, many noise components that may cause image degradation exist, including, for example, image degradation caused by the displacement of the dot impact positions or sub-droplets separated from the main droplet, as well as mechanical variations of the recording head, and fluctuations in paper feeding. The types indicated by A and B are dot layout pattern that are provided with as much randomness as possible in order to cancel such noise components. On the other hand, the types C and D each have a dot layout that is continuous in the longitudinal direction, and therefore are susceptible to the above-described noise components, and likely to undergo image disturbance caused by few noise components. However, since these dot layouts have linearity, the resolution in the longitudinal direction can be increased. When the dot layout is continuous in the transverse direction, the resolution in the transverse direction can be increased.

As described above, various types of dot layout patterns exist, including, a dot layout pattern that is resistant to a noise component caused by the inkjet recording apparatus 10, and a dot layout pattern that increases the resolution of images. Note that for ease of illustration, FIG. 4 shows the dot layout patterns in 4×4 square matrices. However, the shape and size of the dot layout patterns are not limited as long as they are within the range of one pixel that is to be recorded. For example, the size of the dot layout pattern may be set to n×n, and any size may be employed. The dot layout pattern may be an n×m rectangle, and is not limited to a square matrix.

It is desirable that these various dot layout patterns are selected according the properties of an image for which recording is performed. Here, the properties of an image are properties such as the space frequency attributed to a blur of the background of an object located at a near in-focus position in a photographic image. In the dot layout patterning processing (S16) of the present embodiment, at the time of recording a photographic image obtained by performing image shooting by the imaging apparatus 100, the dot layout pattern is selected on the basis of the analysis information obtained together with the photographic image. Accordingly, the imaging apparatus 100 obtains the analysis information on each portion included in the image by the configuration described below. As used herein, the analysis information refers to a value of the distance from the imaging apparatus to each of the object and the background, or the defocus amount at each position of the object and the background, or both the distance value and the defocus amount.

FIG. 5A shows an example of a photographic image. A region 401 is a focused region in which the main object of this image exists, and should be recorded with the highest resolution. In contrast, a region 402 exists at a position at a small distance from the main object, and the image is slightly blurred. A region 403 is located at a large distance from the main object, and is significantly blurred. In the significantly blurred region 403, high-resolution recording is not required. In a region with a low space frequency, such as the region 403, image degradation (a portion visible as streaks or unevenness) caused by noise components of the inkjet recording apparatus is likely to be noticeable. Accordingly, in the present embodiment, dot layout patterns such as the types A and B shown in FIG. 4 are used for the region 493. Although image degradation such as some streaks or unevenness is less likely to be noticeable in the region 401, which is a near in-focus region, recording with a higher resolution is desirable. Accordingly, in the present embodiment, dot layout patterns such as the types C and D shown in FIG. 4 are used for the region 401.

FIGS. 5B and 5C show an exemplary distance map as an example of the analysis information included in an image. FIG. 5B shows how the original image shown in FIG. 5A is divided into predetermined regions. FIG. 5C shows the values of distance from the imaging apparatus for each of the divided predetermined regions. The main object in the region 401 in FIG. 5B is detected to be located at the closest distance, i.e., 0.5 m, from the imaging apparatus. In addition, the object in the region 402 of FIG. 5B is detected to be located at a distance of 0.6 m, and the background portion of the region 403 is detected to be located at infinity. Note that the distances shown in FIG. 5C are examples for illustration, and do not strictly match the image shown in FIG. 5B.

In this example, it is assumed that the focused object is at a distance of 0.5 m. The portion (region detected to have a distance of 0.5 m from the object) shown in the region 401 is in near in-focus. By selecting the dot layout patterns of the types C and D in FIG. 4, the resolution in the longitudinal direction is increased, thus enhancing the image quality. For the portion shown in the region 403, the use of dot layout patterns in which dots are dispersed as randomly as possible as the types A and B in FIG. 4 can diffuse the effect of the noise components of the inkjet recording apparatus, thus suppressing the image degradation.

As described above, it is possible to obtain a suitable image by selecting the dot layout pattern used at the time of performing recording with the inkjet recording apparatus 10, on the basis of the analysis information obtained at the time of performing image shooting by the imaging apparatus 100. Next, a configuration for obtaining the analysis information with the imaging apparatus 100 will be described.

Figure 6:
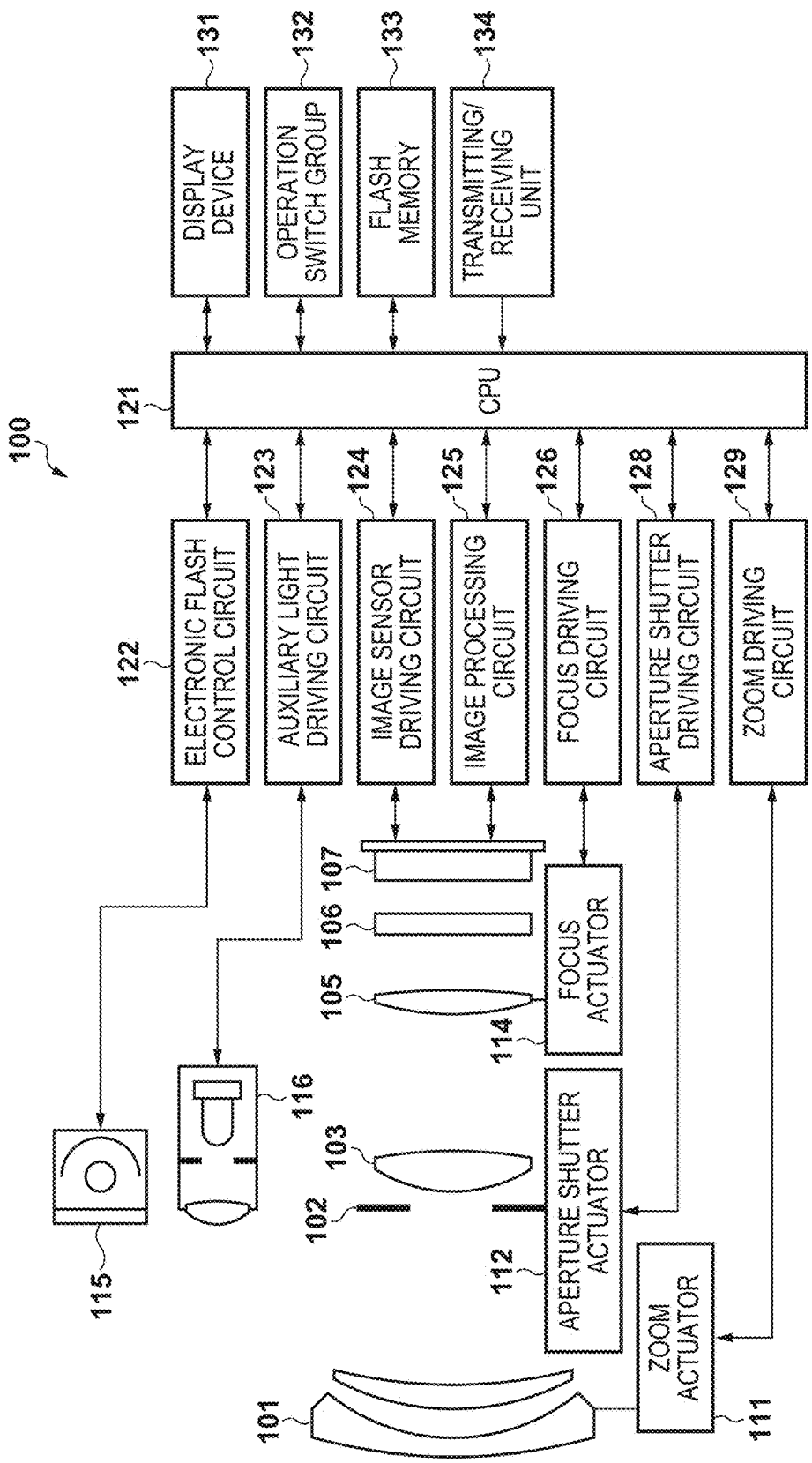
FIG. 6 is a block diagram showing an exemplary configuration of an imaging apparatus according to an embodiment.

FIG. 6 is a block diagram showing an exemplary configuration of an imaging apparatus 100 according to the present embodiment. In FIG. 6, a first lens group 101 is disposed at a distal end of an imaging optical system, and is held so as to be capable of advancing and retracting in the optical axis direction. An aperture/shutter 102 adjusts the light amount during image shooting by adjusting the opening diameter thereof, and also has the function of an exposure time adjustment shutter during at the time of shooting a still image. The aperture/shutter 102 and a second lens group 103 together advance and retract in the optical axis direction, and provide a power varying effect (zoom function) in conjunction with the advancing and retracting operation of the first lens group 101. A third lens group 105 is a so-called focus lens that performs focus adjustment by advancing and retracting in the optical axis direction. An optical low-pass filter 106 is an optical element for reducing false colors and moires of a shot image. An image sensor 107 includes a two-dimensional CMOS photosensor and a peripheral circuit, and is disposed on an image forming plane of the imaging optical system.

A zoom actuator 111 causes the first lens group 101 or the second lens group 103 to advance and retract in the optical axis direction by rotating a cam cylinder (not shown), thus performing a power varying operation. An aperture shutter actuator 112 controls the opening diameter of the aperture/shutter 102 to adjust the amount of image-shooting light, and also controls the exposure time at the time of shooting a still image. A focus actuator 114 performs focus adjustment by driving the third lens group 105 to advance and retract in the optical axis direction.

An electronic flash 115 is used to illuminate the object during image shooting. As the electronic flash 115, a flash illumination device using a xenon tube is preferable, but an illumination device including an LED that continuously emits light may also be used. An AF auxiliary light-emitting unit 116 projects an image of a mask having a predetermined opening pattern onto a field via a light-projecting lens, thus enhancing the focus detection capability for a dark object or a low-contrast object.

A CPU 121 performs various controls for the imaging apparatus 100. The CPU 121 includes an arithmetic unit, a ROM, a RAM, an A/D converter, a D/A converter, a communication interface circuit, and the like, which are not shown. The CPU 121 drives various circuits included in the imaging apparatus on the basis of a predetermined program stored in the ROM, thus executing a series of operations such as AF, capturing, and image processing and recording. In addition, the CPU 121 stores therein a correction value calculation coefficient that is required for focus adjustment using an output signal from an image sensor, which will be described later. A plurality of correction value calculation coefficients are provided for the focus state corresponding to the position of the third lens group 105, the zoom state corresponding to the first lens group 101 or the second lens group 103, the F value of the imaging optical system, the set pupil distance of the image sensor, and each pixel size. At the time of performing focus adjustment, an optimum correction value calculation coefficient is selected according to the focus adjustment state (focus state, zoom state) and the aperture value of the imaging optical system, the set pupil distance of the image sensor, and the combination of pixel sizes. Then, the correction value is calculated from the selected correction value calculation coefficient and the image height of the image sensor.

Although the correction value calculation coefficient is stored in the CPU 121, the present invention is not limited thereto. For example, in an imaging apparatus using an interchangeable lens, the interchangeable lens including an imaging optical system may include a non-volatile memory, and the above-described correction value calculation coefficient may be stored in the memory. In this case, the correction value calculation coefficient is transmitted from the interchangeable lens to the imaging apparatus 100 according to the focus adjustment state of the imaging optical system, for example.

An electronic flash control circuit 122 controls the lighting of the electronic flash 115 in synchronization with an image shooting operation. An auxiliary light driving circuit 123 controls the lighting of the AF auxiliary light-emitting unit 116 in synchronization with a focus detection operation. An image sensor driving circuit 124 controls the imaging operation of the image sensor 107, also performs A/D conversion of the obtained image signal, and transmits the converted signal to the CPU 121. An image processing circuit 125 performs processing such as γ conversion, color interpolation, and JPEG compression on the image obtained by the image sensor 107.

A focus driving circuit 126 controls the driving of the focus actuator 114 on the basis of a result of the focus detection, and performs focus adjustment by driving the third lens group 105 to advance and retract in the optical axis direction. An aperture shutter driving circuit 128 controls the opening of the aperture/shutter 102 by controlling the driving of the aperture shutter actuator 112. A zoom driving circuit 129 drives the zoom actuator 111 in accordance with a zoom operation performed by an operator.

A display unit 131 includes a display device such as an LCD, and displays information relating to an image-shooting mode of a camera, a pre-shooting preview image and a post-shooting confirmation image, the frame of a focus detection region, an in-focus state display image during focus detection, and so forth. An operation switch group 132 includes a power switch, a release (image-shooting trigger) switch, a zoom operation switch, a shooting mode selection switch, and so forth. A flash memory 133 is removable from the imaging apparatus 100, and records images obtained by the imaging apparatus 100. A transmitting/receiving unit 134 enables communication with the host apparatus 30 and the inkjet recording apparatus 10 via a network (not shown) such as a LAN.

Figure 7:
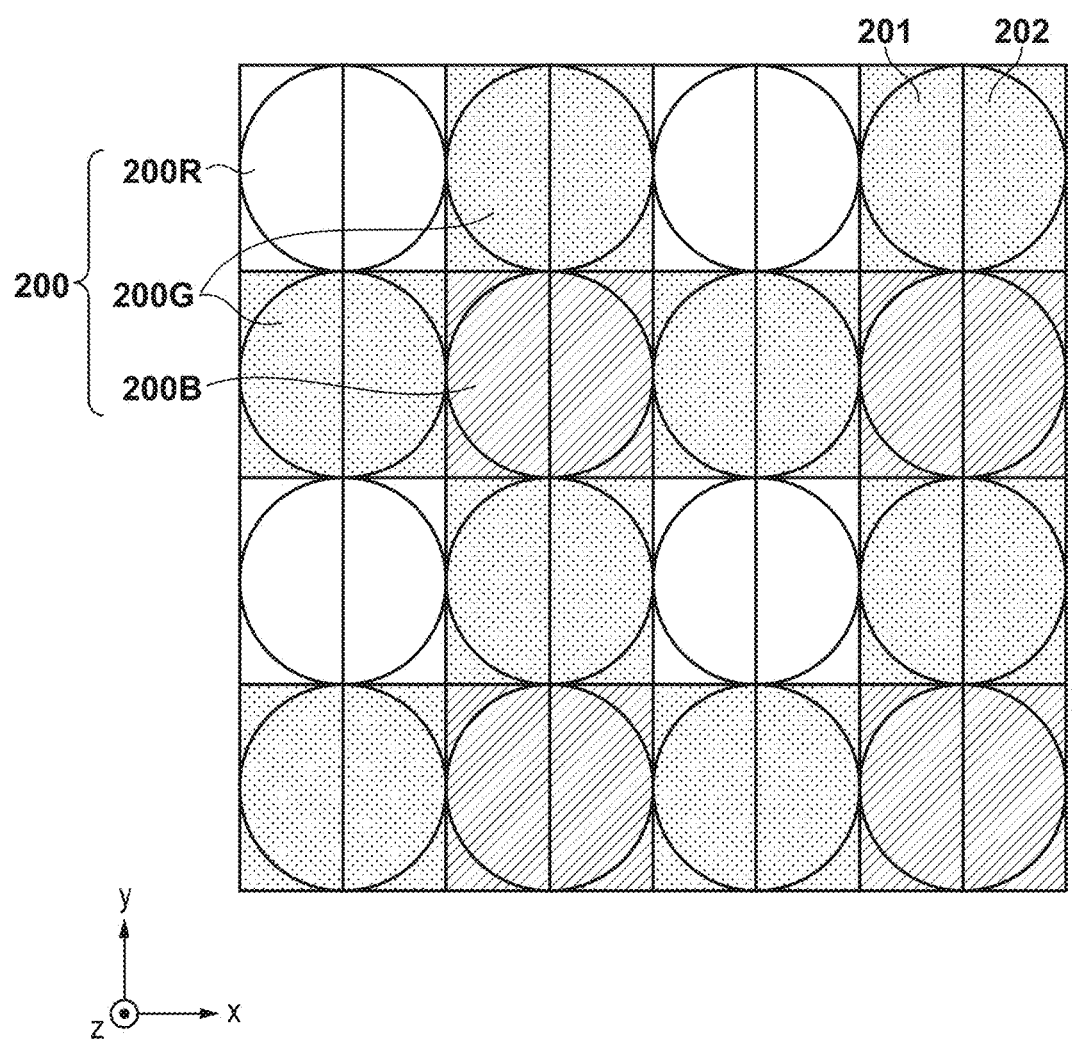
FIG. 7 is a schematic diagram of a pixel array of the imaging apparatus of the embodiment.

A schematic diagram of an array of imaging pixels (and focus detection pixels) of the image sensor 107 included in the imaging apparatus 100 of the present embodiment is shown in FIG. 7. FIG. 7 shows the pixel (imaging pixel) array of a two-dimensional CMOS sensor (image sensor 107) of the present embodiment in the range of 4 columns by 4 rows, and the focus detection pixel array in the range of 8 columns by 4 rows. In the present embodiment, in a pixel group 200 of 2 columns by 2 rows as shown in FIG. 7, a pixel 200R having R (red) spectral sensitivity is disposed on the upper left, pixels 200G having G (green) spectral sensitivity are disposed on the upper right and the lower left, and a pixel 200B having B (blue) spectral sensitivity is disposed on the lower right. Furthermore, each pixel is composed of a first focus detection pixel 201 and a second focus detection pixel 202 arrayed in 2 columns by 1 row.

A large number of 4-column by 4-row pixels (8-column by 4-row focus detection pixels) shown in FIG. 7 are disposed on a plane so as to be able to obtain a captured image (focus detection signal). In the present embodiment, the image sensor will be described assuming that the period P of pixels is 4 μm, the number of pixels N is horizontal 5575 columns×vertical 3725 rows=about 20750000 pixels, the column-direction period PAF of the focus detection pixel is 2 μm, and the focus-detection number of pixels NAF is horizontal 11150 columns×vertical 3725 rows=about 41500000 pixels.

Figure 8A:
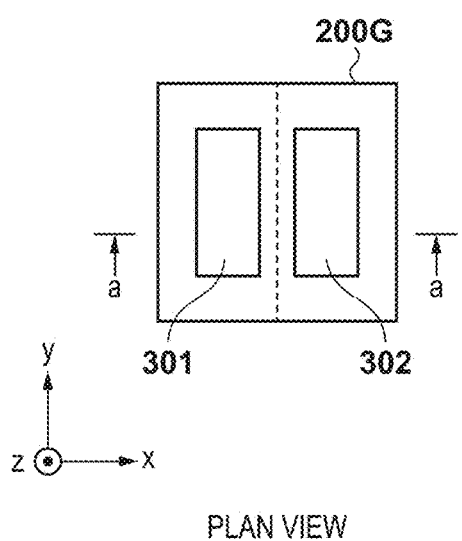
FIG. 8A is a schematic plan view of a pixel in the embodiment.
Figure 8B:
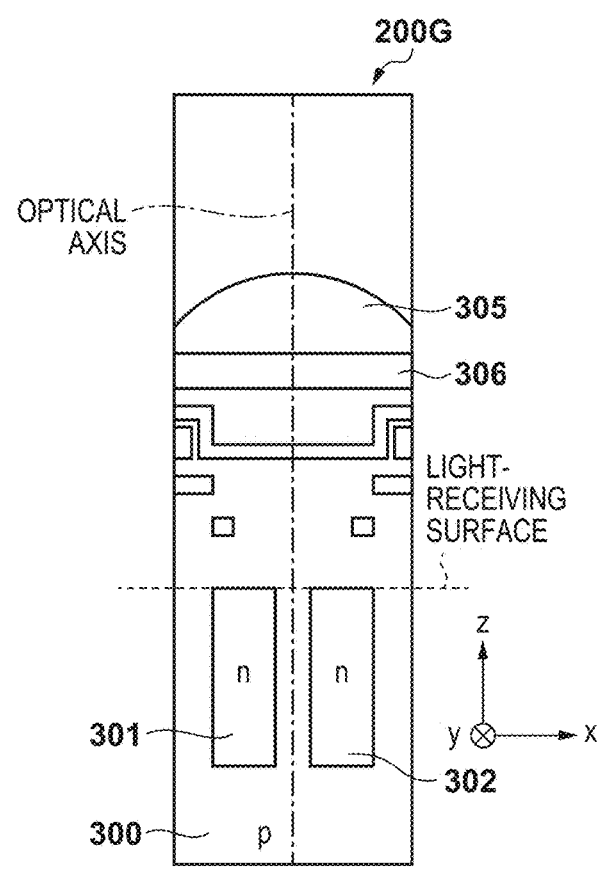
FIG. 8B is a schematic cross-sectional view of the pixel in the embodiment.

FIG. 8A shows a plan view of one pixel 200G of the image sensor shown in FIG. 7, as viewed from the light-receiving surface side (+z side) of the image sensor. FIG. 8B shows a cross-sectional view of the a-a cross section in FIG. 8A, as viewed from the −y side. As shown in FIGS. 8A and 8B, in the pixel 200G of the present embodiment, a microlens 305 for collecting incident light is formed on the light-receiving side of each pixel, and a photoelectric conversion unit 301 and a photoelectric conversion unit 302 that are divided into NH (two) in the x direction and divided into NV (1) in the y direction are formed. The photoelectric conversion unit 301 and the photoelectric conversion unit 302 correspond to the first focus detection pixel 201 and the second focus detection pixel 202, respectively.

The photoelectric conversion unit 301 and the photoelectric conversion unit 302 may be each configured as a pin-structured photodiode in which an intrinsic layer is sandwiched between a p-type layer and an n-type layer, or may be configured as a pn-junction photodiode by omitting the intrinsic layer as needed. In each pixel, a color filter 306 is formed between the microlens 305 and the photoelectric conversion unit 301 and the photoelectric conversion unit 302. If necessary, the spectral transmittance of the color filter may be varied from pixel to pixel, or the color filter may be omitted.

In FIGS. 8A and 8B, the light incident on the pixel 200G is collected by the microlens 305, then separated by the color filter 306, and subsequently received by the photoelectric conversion unit 301 and the photoelectric conversion unit 302. In the photoelectric conversion unit 301 and the photoelectric conversion unit 302, electron-hole pairs are created according to the amount of light received. After the electron-hole pairs are separated in a depletion layer, the negatively charged electrons are accumulated in an n-type layer (not shown), and the positively charged holes are discharged to the outside of the image sensor via a p-type layer connected to a constant voltage source (not shown). The electrons accumulated in the n-type layers (not shown) of the photoelectric conversion unit 301 and the photoelectric conversion unit 302 are transferred to an electrostatic capacitance unit (FD) via a transfer gate, and converted into voltage signals.

Figure 9:
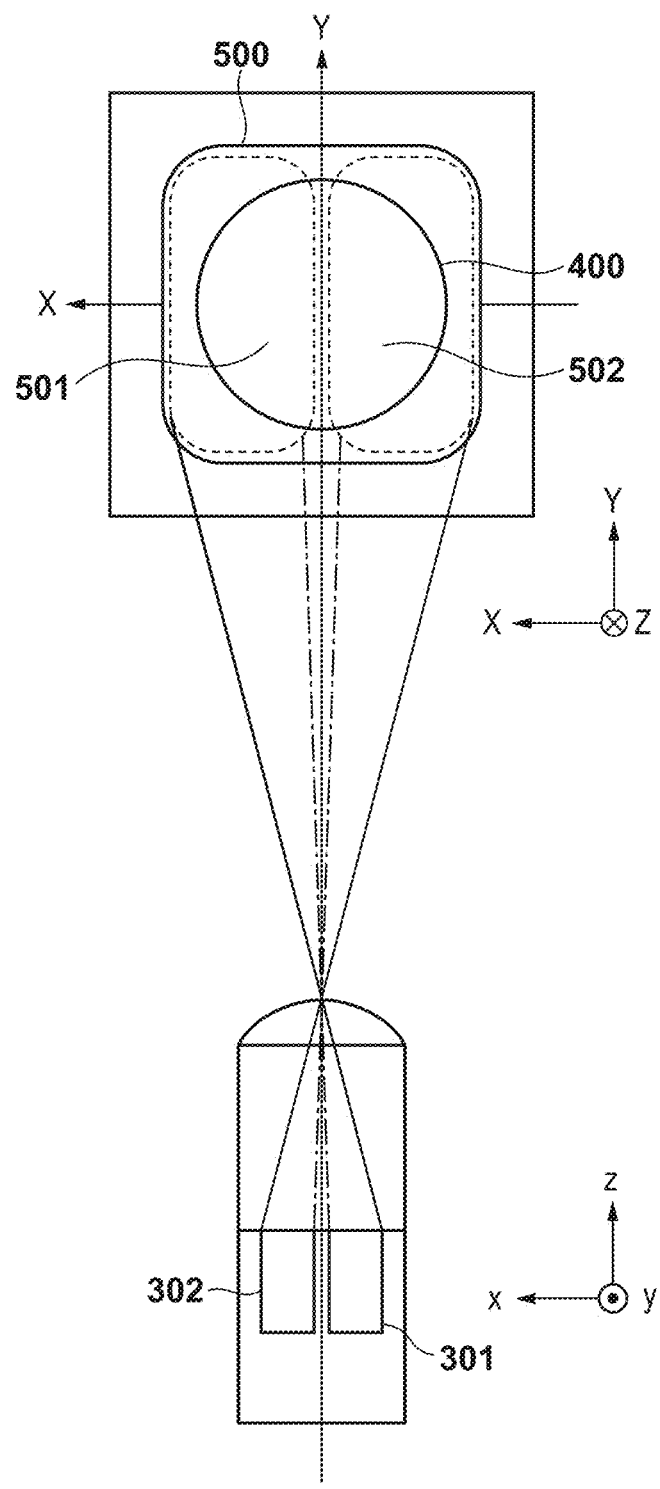
FIG. 9 is a schematic explanatory diagram of the pixel and pupil division in the embodiment.

FIG. 9 shows a schematic explanatory diagram showing the correspondence between the pixel structure of the present embodiment shown in FIGS. 8A and 8B and pupil division. FIG. 9 shows a cross-sectional view of the a-a cross section of the pixel structure of the present embodiment shown in FIG. 8A, as viewed from the +y side, and a view of an exit pupil plane of the imaging optical system as viewed from the −z side. In FIG. 9, to establish correspondence with the coordinate axes of the exit pupil plane, the x axis and the y axis in the cross-sectional view are inverted relative to those in FIGS. 8A and 8B.

In FIG. 9, a first pupil sub-region 501 of the first focus detection pixel 201 is brought, by the microlens, into a generally conjugate relationship with the light-receiving surface of the photoelectric conversion unit 301 whose center of gravity is eccentric to the −x direction, and represents a pupil region where light can be received by the first focus detection pixel 201. The center of gravity of the first pupil sub-region 501 of the first focus detection pixel 201 is eccentric to the +x side on the pupil plane.

In FIG. 9, a second pupil sub-region 502 of the second focus detection pixel 202 is brought, by the microlens, into a generally conjugate relationship with the light-receiving surface of the photoelectric conversion unit 302 whose center of gravity is eccentric to the +x direction, and represents a pupil region where light can be received by the second focus detection pixel 202. The center of gravity of the second pupil sub-region 502 of the second focus detection pixel 202 is eccentric to the −X side on the pupil plane.

In FIG. 9, a pupil region 500 is a pupil region where light can be received by the entire pixel 200G when the photoelectric conversion unit 301 and the photoelectric conversion unit 302 (the first focus detection pixel 201 and the second focus detection pixel 202) are all combined.

Imaging plane phase difference AF performs pupil division by using the microlens of the image sensor, and is thus affected by diffraction. In FIG. 9, the pupil distance to the exit pupil plane is several tens of millimeters, whereas the diameter of the microlens is several micrometers. Accordingly, the aperture value of the microlens is several tens of thousands, resulting in diffraction blur on the order of several tens of millimeters. Consequently, an image of the light-receiving surface of the photoelectric conversion unit does not result in a clear pupil region or pupil sub-region, but results in a pupil intensity distribution (incident angle distribution of a light-receiving ratio).

Figure 10:
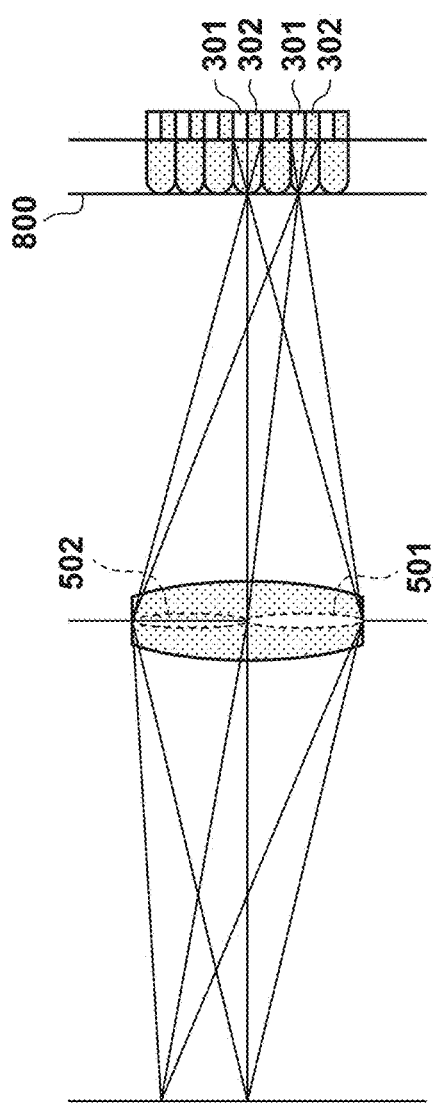
FIG. 10 is a schematic explanatory diagram of an image sensor and the pupil division in the embodiment.

FIG. 10 shows a schematic diagram showing correspondence between the image sensor of the present embodiment and pupil division. Light fluxes that have passed through different pupil sub-regions of the first pupil sub-region 501 and the second pupil sub-region 502 are incident on pixels of the image sensor at different angles. The light fluxes incident on the pixels are received by the first focus detection pixel 201 (photoelectric conversion unit 301) and the second focus detection pixel 202 (photoelectric conversion unit 302) that are divided into 2×1. Although the present embodiment shows an example in which the pupil region is divided into two in the horizontal direction, the pupil division may be performed in the vertical direction.

In the image sensor of the present embodiment, a plurality of imaging pixels each having the first focus detection pixel 201 and the second focus detection pixel 202 are arrayed. The first focus detection pixel 201 receives a light flux passing through the first pupil sub-region 501 of the imaging optical system. The second focus detection pixel 202 receives a light flux passing through the second pupil sub-region 502 of the imaging optical system. The first pupil sub-region 501 and the second pupil sub-region 502 are regions different from each other. The imaging pixel receives light fluxes passing through a pupil region formed by a combination of the first pupil sub-region 501 of the second pupil sub-region 502 of the imaging optical system. If necessary, the imaging pixel, the first focus detection pixel, and the second focus detection pixel have separate pixel configurations, and the first focus detection pixel and the second focus detection pixel are partly disposed on a portion of the imaging pixel array.

In the present embodiment, focus detection is performed by generating a first focus detection signal by collecting the photoreception signals of the first focus detection pixel 201 of each pixel of the image sensor 107 and generating a second focus detection signal by collecting the photoreception signals from the second focus detection pixel 202 of each pixel. By adding the signals of the first focus detection pixel 201 and the second focus detection pixel 202 for each pixel of the image sensor 107, an imaging signal (captured image) with a resolution of an effective number of pixels N is generated.

Next, a relationship between the defocus amounts and the image shift amounts of the first focus detection signal and the second focus detection signal obtained by the image sensor of the present embodiment will be described.

Figure 11:
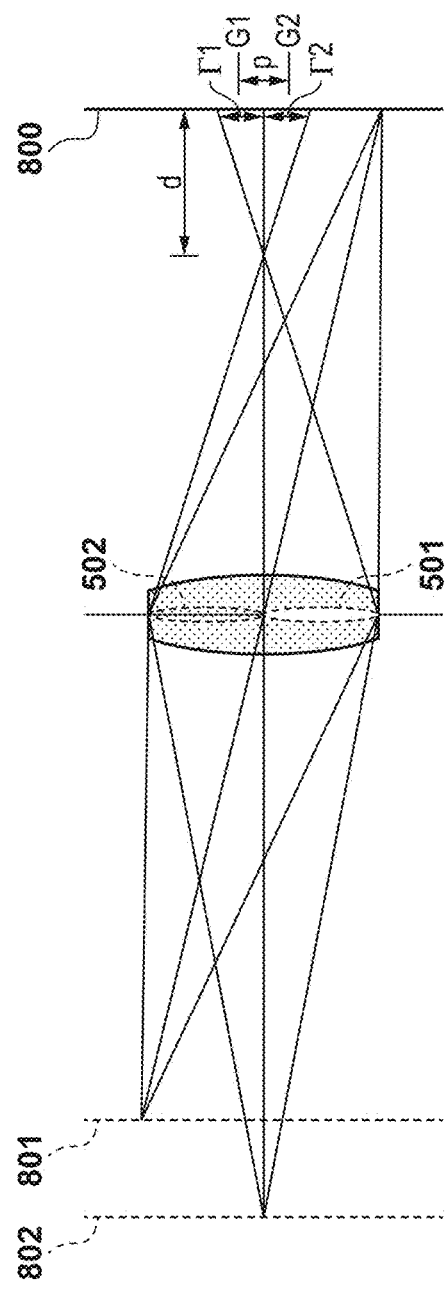
FIG. 11 is a diagram schematically showing a relationship between the defocus amounts and the image shift amounts of a first focus detection signal and a second focus detection signal.

FIG. 11 shows a diagram schematically showing a relationship between the defocus amounts of the first focus detection signal and the second focus detection signal, and the image shift amounts of the first focus detection signal and the second focus detection signal. The image sensor 107 (not shown) of the present embodiment is disposed on an imaging plane 800, and the exit pupil of the imaging optical system are divided into two, namely, the first pupil sub-region 501 and the second pupil sub-region 502, similarly to FIGS. 9 and 10.

Regarding the defocus amount d, the distance from the image forming position of an object to the imaging plane 800 is defined as the magnitude a front focus state in which the image forming position of the object is located closer to the object side relative to the imaging plane is defined as a negative sign (d<0). A rear focus state in which the image forming position of the object is located opposite side of the object relative to the imaging plane is defined as a positive sign (d>0). An in-focus state in which the image forming position of the object is located on the imaging plane (in-focus position) is defined as d=0. In the example shown in FIG. 11, an object 801 is in the in-focus state (d=0), and an object 802 is in the front focus state (d<0). The front focus state (d<0) and the rear focus state (d>0) are collectively referred to as a defocus state (|d|>0).

In the front focus state (d<0), of the light fluxes from the object 802, the light flux that has passed through the first pupil sub-region 501 (second pupil sub-region 502) is temporarily collected in front of the imaging plane 800. Then, the light flux expands to a width Γ1 (Γ2) with its gravity center position G1 (G2) as the center, and forms a blurred image on the imaging plane 800. The blurred image is received by the first focus detection pixel 201 (second focus detection pixel 202) composing each of the pixels arrayed in the image sensor, and a first focus detection signal (second focus detection signal) is generated. Accordingly, the first focus detection signal (second focus detection signal) is recorded at a gravity center position G1 (G2) on the imaging plane 800 as an object image in which the object 802 is blurred to a width Γ1 (Γ2). The blur width Γ1 (Γ2) of the object image increases generally proportional to an increase in the magnitude |d| of the defocus amount d. Likewise, the magnitude of the image shift amount p (=difference G1−G2 between the gravity center positions of the light flux) of the object image between the first focus detection signal and the second focus detection signal also increases generally proportional to an increase in the magnitude |d| of the defocus amount d. The same applies to the rear focus state (d>0), except that the image shift direction of the object image between the first focus detection signal and the second focus detection signal is opposite from that of the front focus state.

Accordingly, in the present embodiment, the image shift amount between the first focus detection signal and the second focus detection signal increases as an increase in the first focus detection signal and the second focus detection signal, or an increase in the magnitude of the defocus amount of the imaging signal in which the first focus detection signal and the second focus detection signal are added.

In the following, focus detection using a phase difference method of the present embodiment will be described.

In the focus detection using a phase difference method of the present embodiment, a correlation amount representing a signal matching degree is calculated by relatively shifting the first focus detection signal and the second focus detection signal, and the image shift amount is detected from a shift amount that provides a good correlation (signal matching degree). Based on a relationship in which the magnitude of the image shift amount between the first focus detection signal and the second focus detection signal increases with an increase in the magnitude of the defocus amount of the imaging signal, focus detection is performed after converting the image shift amount into a detection defocus amount using a conversion coefficient.

Figure 12:
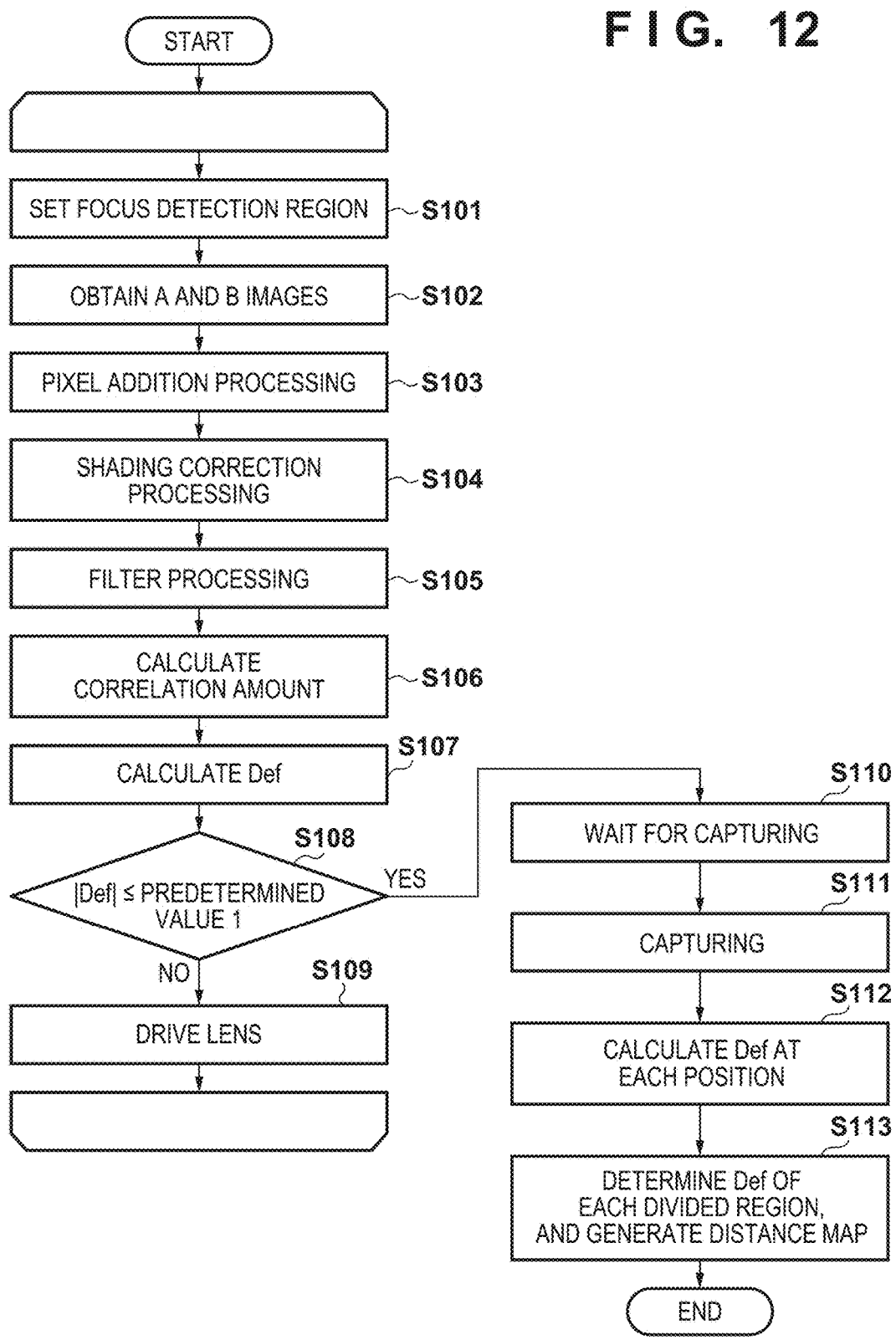
FIG. 12 is a flowchart illustrating focus detection processing and capturing processing in an embodiment.

FIG. 12 shows a schematic diagram of the flow of the focus detection processing and the generation of the analysis information according to the present embodiment. Note that the operations shown in FIG. 12 are executed by the image sensor 107, the image processing circuit 125, and the CPU 121.

In step S101, the CPU 121 sets the focus detection region centered at the image height (X, Y) at which focus adjustment is performed, from the effective pixel region of the image sensor 107. In step S102, the CPU 121 generates a first focus detection signal (A image) from a photoreception signal of the first focus detection pixel in the focus detection region, and generates a second focus detection signal (B image) from a photoreception signal of the second focus detection pixel in the focus detection region. The A image and the B image constitute a so-called parallax image.

In step S103, the CPU 121 performs 3-pixel addition processing in the column direction on each of the first focus detection signal and the second focus detection signal, and further performs Bayer (RGB) addition processing. The 3-pixel addition processing in the column direction is performed in order to suppress the signal data amount that is to be processed. The Bayer addition processing is performed in order to convert an RGB signal into a luminance signal. These two types of addition processing are collectively referred to as pixel addition processing.

In step S104, the CPU 121 performs shading correction processing (optical correction processing) on each of the first focus detection signal and the second focus detection signal. In the following, a description will be given of the change in the conversion coefficient required for conversion of an image shift amount resulting from pupil shift between the first focus detection signal and the second focus detection signal into a detection defocus amount, and shading.

FIGS. 13A to 13C show a relationship between baseline lengths BL0, BL1, and BL2, the first pupil sub-region 501 of the first focus detection pixel 201, the second pupil sub-region 502 of the second focus detection pixel 202 at a peripheral image height of the image sensor 107, and an exit pupil 400 of the imaging optical system. In FIGS. 13A to 13C, the exit pupil distance Dl denotes a distance between the exit pupil 400 of the imaging optical system and the imaging plane of the image sensor 107 in the optical axis direction. The set pupil distance Ds denotes a distance in the optical axis direction between the image sensor 107 and the position at which an optical axis 303 intersects a direction of the highest sensitivity among the angular characteristics of the light-receiving sensitivity at the peripheral image height.

FIG. 13A shows a case where the exit pupil distance Dl of the imaging optical system and the set pupil distance Ds of the image sensor are the same. In this case, the exit pupil 400 of the imaging optical system is divided generally equally by the first pupil sub-region 501 and the second pupil sub-region 502. BL0 denotes a baseline length that is the interval between the center of gravity of the first pupil sub-region 501 and the center of gravity of the second pupil sub-region 502 inside the exit pupil 400. At this time, the conversion coefficient K0 required for conversion of the image shift amount into the detection defocus amount can be determined by K0=Ds/BL0.

In contrast, FIG. 13B shows a case where the exit pupil distance Dl of the imaging optical system is shorter than the set pupil distance Ds of the image sensor 107. In this case, at the peripheral image height of the image sensor, a pupil shift occurs between the exit pupil of the imaging optical system and the entrance pupil of the image sensor, and the exit pupil 400 of the imaging optical system is unequally divided. Accordingly, the baseline length is BL1, which is deviated to one side, as a result of which the conversion coefficient also changes to K1=Ds/BL1.

Similarly, FIG. 13C shows a case where the exit pupil distance Dl of the imaging optical system is longer than the set pupil distance Ds of the image sensor. In this case, at the peripheral image height of the image sensor, a pupil shift occurs between the exit pupil of the imaging optical system and the entrance pupil of the image sensor, and the exit pupil 400 of the imaging optical system is unequally divided. Accordingly, the baseline length is BL2, which is deviated to the side opposite to that shown in FIG. 13B, as a result of which the conversion coefficient also changes to K2=Ds/BL2.

Due to the unequal pupil division at the peripheral image height, the intensities of the first focus detection signal and the second focus detection signal also become unequal, resulting in shading in which the intensity of one of the first focus detection signal and the second focus detection signal is increased, and the intensity of the other is decreased. Furthermore, when the aperture value of the imaging optical system changes, the sizes of the exit pupil 400 in FIGS. 13A to 13C change, and therefore, it can be seen that the conversion coefficient and the shading also change depending on the aperture value. Accordingly, it can be seen that the conversion coefficient from the image shift amount into the detection defocus amount, and shading change depending on the aperture value of the imaging optical system, the exit pupil distance, the pupil intensity distribution (optical characteristics) of the image sensor, and the image height.

Next, the CPU 121 generates a first shading correction coefficient for the first focus detection signal and a second shading correction coefficient for the second focus detection signal according to the image height of the focus detection region, the F value of the imaging lens (imaging optical system), and the exit pupil distance. The shading correction processing (optical correction processing) for the first focus detection signal and the second focus detection signal is performed by multiplying the first focus detection signal by the first shading correction coefficient, and multiplying the second focus detection signal by the second shading correction coefficient.

In the imaging plane focus detection using an image plane phase difference method, the detection defocus amount is detected on the basis of the correlation (signal matching degree) between the first focus detection signal and the second focus detection signal. When shading due to pupil shift occurs, the correlation (signal matching degree) between the first focus detection signal and the second focus detection signal may be reduced. Therefore, in the focus detection using a phase difference method, it is desirable that the shading correction processing (optical correction processing) is performed in order to improve the correlation (signal matching degree) between the first focus detection signal and the second focus detection signal to achieve a good focus detection performance.

Although the pupil shift is described above in an exemplary case where the set pupil distance of the image sensors 107 is the same, whereas the exit pupil distance of the imaging optical system changes, the same description applies to a case where the exit pupil distance of the imaging optical system is the same, whereas the set pupil distance of the image sensor 107 changes. In the imaging plane focus detection using a phase difference method, with this change in the set pupil distance of the image sensor 107, the light flux received by the focus detection pixel (the first focus detection pixel, the second focus detection pixel) and the light flux received by the imaging pixel also change.

Next, in step S105, in order to improve the correlation (signal matching degree) to increase the focus detection accuracy, the CPU 121 performs processing using a band-pass filter having a specific passing frequency band on the first focus detection signal and the second focus detection signal. Examples of the band-pass filter include differential filters such as {1, 0, −1} with which edge extraction is performed by cutting DC components, and summing filters such as {1, 2, 1} with which high-frequency noise components are suppressed. Next, in step S106, the CPU 121 performs shift processing for relatively shifting the filter-processed first focus detection signal and second focus detection signal in the pupil division direction, to calculate a correlation amount representing a signal matching degree. When the shift amount by the shift processing is denoted as s, and the shift range of the shift amount s is denoted as Γ, the correlation amount COR can be calculated by Expression (1). Here, the kth filter-processed first focus detection signal is denoted as A (k), and the second focus detection signal is denoted as B (k), and the range of number k corresponding to the focus detection region is denoted as W.

$$COR(s) = \sum_{k \in W} |A(k) - B(k-s)|, \quad s \in \Gamma \qquad (1)$$

By the shift processing of the shift amount s, the kth first focus detection signal A (k) and the k-sth second focus detection signal B (k-s) are associated with each other and subtraction is performed, thus generating a shift subtraction signal. The absolute value of the generated shift subtraction signal is calculated, and the sum of the number k is obtained in a range W corresponding to the focus detection region, thus calculating a correlation amount COR(s). If necessary, the correlation amount calculated for each row may be added for a plurality of rows for each shift amount.

In step S107, the CPU 121 calculates, from the correlation amount, a shift amount of a real number that provides a minimum value of the correlation amount is calculated by a subpixel operation, and the calculated shift amount is used as an image shift amount p. The detection defocus amount (Def) is detected by multiplying the image shift amount p by the image height of the focus detection region and the F value of the imaging lens (imaging optical system), and the conversion coefficient K corresponding to the exit pupil distance. In step S108, the CPU 121 compares |Def| with a predetermined value. If the predetermined value is greater than |Def| (NO in S108), the CPU 121, in step S109, drives the lens in accordance with the detection defocus amount to perform focus adjustment. Thereafter, the processing from step S101 is repeated. On the other hand, if |Def| is less than or equal to the predetermined value (YES in S108), the CPU 121 ends the focus adjustment, and waits for an image-shooting instruction in step S110. When an image shooting is instructed in this state, the CPU 121 executes capturing using the image sensor 107 in step S111.

Then, in step S112, the CPU 121 calculates the defocus amount (Def) of each portion of the captured image by using the first focus detection signal and the second focus detection signal obtained in step S102. The method for calculating Def is as described with regard to steps S103 to S107. In step S113, the CPU 121 calculates the defocus amount of each of the divided regions as shown in FIG. 5B on the basis of the Def calculated in step S112. For example, the CPU 121 calculates Def for one or more positions set in advance for each sub-region (S112), and calculates the average value (S113), thereby calculating the defocus amount of each of the sub-regions on the captured image. In this manner, analysis information (distance map) as shown in FIG. 5C or as will be described later with reference to FIG. 14B, is generated.

In the present embodiment, the defocus amount is calculated using an image with different viewpoints (parallax image) obtained by the image sensor 107 as described above, and the calculated defocus amount is used as the analysis information. However, the analysis information is not limited thereto. For example, information from which the positional relationship of the object in the depth direction can be known, depth information obtained by a DFD (Depth From Defocus) method in which depth-direction distance is calculated from a plurality of images at different focus positions in the same region, can be used as the analysis information. It is also possible to use depth-direction distance information obtained by a TOF (Time OF Flight) method. Alternatively, object detection processing for detecting a specific object based on a specific feature amount from an image signal (image data) may be performed, and the size of each object or the magnitude of a frequency component, the priority or the like may be determined from the detected result, and be included as the analysis information.

Next, a distance map as an example of the analysis information used by the inkjet recording apparatus 10 at the time of selecting the dot layout pattern will be described. A distance map is obtained by mapping the distance information at each point included in an image plane. For ease of explanation, the map in FIG. 5C shown as an example of the distance map is a coarse map. The number of divisions of an image in the distance map is not limited, and any number of divisions may be used according to the processing capability and performance of the imaging apparatus and the inkjet recording apparatus. Note that the distance map is generated by an image processing apparatus included in the imaging apparatus, or an image processing apparatus that is external to the imaging apparatus and that processes images shot by the imaging apparatus.

The numerical value placed in the distance map may be, for example, the above-described defocus amount of each point, or may be the distance (FIG. 5B) from the imaging apparatus 100 (the imaging plane of the image sensor 107) to the object, calculated from the defocus amount and optical information. Any numerical value may be used as long as an in-focus object and its relative positional relationship can be recognized from the numerical value placed in the distance map. For example, in the case of FIG. 5C, an in-focus object and its relative positional relationship can be obtained through notification of the distance (e.g., 0.5 m) to the in-focus object or an in-focus sub-region, together with the illustrated distance information (distance map).

The resolution of the distance information in the distance map may be freely set. For example, the dot layout patterns illustrated in FIG. 4 have four types, namely, A to D. By setting the resolution of the distance information in the distance map to 4 or more in order to select one of the four types of dot layout patterns according to the distance map, the effects of the present embodiment can be easily achieved.

Next, an example of the selection criterion for the dot layout patterns based on the analysis information will be described. The dot layout pattern indicated by B in FIG. 4 has the highest randomness among A to D. On the contrary, the dot layout pattern indicated by C in FIG. 4 is the pattern having the lowest randomness, and dots are arranged in the vertical or horizontal direction.

To quantitatively define the feature amount of the dot layout pattern, an intermediate density, for example, a probability (dot adjacency probability) that dots per unit area are located vertically or horizontally adjacent to each other in a dot layout pattern in a state in which the coverage ratio is about 25% is calculated. The calculated dot adjacency probability is used as the dot layout pattern feature amount.

In the example shown in FIG. 4, B has the lowest dot adjacency probability, and the probability that the applied dots are located adjacent to each other is 0. Such a dot layout pattern is most unlikely to undergo fluctuation of the coverage ratio due to dots overlapping each other even when a mechanical noise component of the inkjet recording apparatus is added, and is therefore a highly robust dot layout that does not cause streaks or unevenness. Further, C in FIG. 4 has the highest dot adjacency probability, and therefore, the line segments are most likely to be aligned straight at the time of printing a horizontal line or a vertical line, thus making it possible to achieve a high resolution.

In dot layout patterning processing (S16), the inkjet recording apparatus 10 selects distance map information and the dot layout pattern feature amount, on the basis of the table shown in FIG. 14A. FIG. 14A shows which dot layout pattern should be selected for each defocus amount in a distance map using defocus amounts. That is, the inkjet recording apparatus 10 has a table that associates the analysis information with the dot layout pattern feature amount indicating the feature of the dot layout pattern. Then, the inkjet recording apparatus 10 selects the dot layout pattern having a dot layout pattern feature amount selected by referring to the table.

In the case of a defocus amount of 0 mm to 0.5 mm, the dot layout pattern having a dot layout pattern feature amount with a dot adjacency probability of 100% is selected. Likewise, for a significantly blurred region having a defocus amount of 5 mm or more, a dot layout pattern having a dot layout pattern feature amount with a dot adjacency probability of 0% is selected. In this manner, for each dot layout pattern, the dot adjacency probability is held in advance as a numerical value as the dot layout pattern feature amount, and the dot layout pattern (dot adjacency probability) is selected on the basis of the defocus amount and the table shown in FIG. 14A. Thus, in the dot layout patterning processing of the present embodiment, the larger the blur amount determined from the analysis information, the smaller the deviation of the positions of the recorded dots of the selected dot layout pattern is.

For example, a case where the distance map of the defocus amounts has been obtained as the analysis information as shown in FIG. 14B is assumed. In the distance map, for example, the region in which the defocus amount is 0 to 0.5 mm is a substantially focused region, and the pattern with a dot adjacency probability of 100% (type C in FIG. 4) is selected from the table shown in FIG. 14A. In the distance map shown in FIG. 14B, the region in the defocus amount is greater than or equal to 5.0 mm has a large amount of blur, and the pattern with a dot adjacency probability of 0% (type B in FIG. 4) is selected.

Note that in the present embodiment, the defocus amount of each region (each object) is calculated from the correlation waveform between the parallax signals corresponding to each region. Accordingly, the defocus amount of an object that originally contains substantially no high-frequency component, and an object located at a position at a high image height of the image sensor may not be calculated accurately. The defocus amount of such an object may be determined by performing interpolation from the defocus amount of a peripheral region within a predetermined range. Alternatively, the defocus amount of such an object may be treated as the defocus amount for selecting a dot layout pattern for which a greater amount of image quality degradation is permitted.

Other examples of the dot layout pattern selection using analysis information include a method in which selection is performed in the same manner as with the defocus amount, on the basis of the distance information obtained using the above-described DFD or TOF method. Alternatively, the positional relationship in the depth direction or the priority may be determined on the basis of object detection processing, and may be used as the analysis information. Then, the dot layout pattern may be selected such that an object located close to the distance of the main object (the depth-direction position of a focused object) is recorded with a higher resolution than the resolution with which a farther object is recorded. At this time, the dot layout pattern is selected such that an object with a high priority is recorded with a higher resolution.

Note that the dot layout pattern feature amount is not limited to the dot adjacency probability described above. For example, the more linear the alignment of dots, the higher the resolution provided by the dots becomes. Accordingly, the index indicating the linearity of the dot alignment may be used as the dot layout pattern feature amount. As the index indicating the linearity of the dot layout pattern, qualitative indices of the dot layout linearity, namely, "High", "Medium", "Low" and the like, or numerical values representing variations in dot layouts in the longitudinal direction or the transverse direction may be used.

FIGS. 15A to 15B show example of variations in the dot layouts from a vertical line. Although FIGS. 15A and 15B both show dot layout patterns with a coverage ratio of 25%, they show significantly different variations in the horizontal direction when the dot layouts are viewed as a vertical line. In FIG. 15A, the dot layout pattern has a variation only in the range of 2 dots relative to the vertical line, the dot layout pattern has a variation in the range of 4 dots in FIG. 15B, resulting in a lower linearity. In this manner, the range of dot variations (amount of variation) in the horizontal or vertical direction at a predetermined coverage ratio may be used as the dot layout pattern feature amount.

In the present embodiment, an example is described in which the probability that dots are located adjacent to each other at a predetermined coverage ratio is used as an example of the dot layout pattern feature amount. However, the present invention may use another index as long as the dot layout pattern is selected on the basis of the analysis information.

Using the methods described thus far, the dot layout pattern of type C shown in FIG. 4 is selected for, for example, the region 401 shown in FIG. 5A that is located at a near in-focus position and requires the highest resolution. For the significantly blurred region 403 shown in FIG. 5A, a dot layout pattern as indicated as the type B in FIG. 4 is selected. Thus, streaks or unevenness will not be noticeable in a blurred region, and high-resolution recording can be achieved in a region at a near in-focus position.

Second Embodiment

In the first embodiment, the dot layout pattern of the inkjet recording apparatus is selected on the basis of the analysis information. In the second embodiment, the dot layout pattern is selected by taking into account the conditions for the optical system (optical conditions) during image shooting, in addition to the analysis information (e.g., the distance to an object (or the defocus amount)).

Specifically, the focal distance of the optical system, as well as the F value and the object distance are preferably used as the optical conditions. As is widely known, the intensity of blur in the optical system of an imaging apparatus changes depending on the optical conditions for the focal distance and the F value, and the object distance. The longer the focal distance of the optical system of the imaging apparatus, the greater the blur becomes. Likewise, the smaller (brighter) the F value, the greater the blur becomes. Also, the smaller the object distance, the greater the blur becomes. In the second embodiment, the dot layout pattern used by the inkjet recording apparatus 10 is selected according to the amount of blur.

For example, in the analysis information (distance map) for each sub-region, it is possible to use a value (simplified blur amount) obtained by standardizing the defocus amount (|def|) detected by the above-described focus detection processing by using a diameter of a permissible circle of confusion and an F value. The simplified blur amount can be represented by Expression (2) as follows. Here, Def (mm) denotes the defocus amount, F denotes the F value, and δ (mm) denotes the diameter of a permissible circle of confusion.

$$\text{Simplified blur amount} = \text{Def}/(F \times \delta) \qquad (2)$$

The simplified blur amount represented by Expression (2) is an example of the method for quantitatively representing the blur intensity, and the larger the value of the simplified blur amount, the greater the intensity of the blur becomes. By selecting a dot layout pattern with high randomness (e.g., a low adjacency probability) for a higher blur intensity, it is possible to obtain an image that undergoes less image quality degradation and has a high resolution. Accordingly, by selecting the dot layout pattern on the basis of the simplified blur amount standardized with an F value and a permissible circle of confusion as shown in the present embodiment, it is also possible to achieve the same effect as that achieved in the first embodiment. Further, this simplified blur amount is obtained by taking into account the optical conditions (an F value and a diameter of a permissible circle of confusion) in addition to the defocus amount. Of course, other optical conditions such as a focal distance and an object distance may be taken into account.

Third Embodiment

Next, the third embodiment will be described. In the examples shown in the first and second embodiments, at the time of directly recording a captured image by the inkjet recording apparatus 10, the analysis information of the image is used. Nowadays, imaging apparatuses exist that perform so-called refocus processing for changing the image forming position in the optical axis direction in an emulated manner on the basis of the obtained parallax information. Also, imaging apparatuses that perform sense-of-resolution correction processing for shifting the position at which an image is sharpened in a near in-focus region, on the basis of the distance map information in order to enhance the sense of resolution in the near in-focus region.

In the third embodiment, an application to such an image for which the sense of resolution at a near in-focus position is to be further enhanced will be described. For example, when the user has performed refocus processing, the analysis information (distance map) is updated on the basis of a new focus position and a parallax image, and the dot layout pattern is selected using the updated analysis information. For example, when the user has performed the sense-of-resolution correction processing, it is desirable to select a dot layout pattern with which the resolution can be increased in a near in-focus region. If the user can set the intensity of the correction processing at the time of performing the sense-of-resolution correction processing, the dot layout pattern may be selected according to the intensity of the correction processing. For example, to change the intensity of the sense-of-resolution correction processing, the distance at which focus is achieved in a near in-focus region is changed. Accordingly, the analysis information in the near in-focus region is updated, and the dot layout pattern is selected using the updated analysis information. In this manner, the present invention can be applied to meet the user's need for the resolution.

As described above, according to the above-described embodiments, the blur level of an image is defined on the basis of the analysis information obtained at the time of actually shooting the image, so that it is possible to more appropriately select the dot layout pattern applied to each portion (each pixel) of the image.

Other Embodiments

As has been described thus far, it is possible to obtain an image with less image quality degradation and a high resolution by selecting the dot layout pattern of the inkjet recording apparatus, on the basis of the distance information obtained at the time of performing capturing by the imaging apparatus. Next, a method of transferring the analysis information will be described.

As the distance map as described in the first to third embodiments, a distance map calculated by the imaging apparatus 100 may be saved by being embedded into image data. Alternatively, the distance map may be attached to image data, and saved as a separate file. In either case, a captured image and the analysis information obtained at the time of capturing the image may be associated with each other. The distance map may be generated by an information processing apparatus that functions as the host apparatus 30 for an image processing apparatus, a personal computer, a smartphone or the like. At this time, image data containing the first and second focus detection signals (parallax image) obtained by the imaging apparatus 100 is transferred from the imaging apparatus 100 to the information processing apparatus, and the information processing apparatus calculates the distance map. When performing recording by controlling the inkjet recording apparatus 10, the information processing apparatus transmits the calculated distance map together with the image data, and performs recording. Alternatively, recording data containing a captured image and a parallax image may be directly transferred to the inkjet recording apparatus 10, without generating a distance map in the imaging apparatus 100 or the information processing apparatus, and the distance map may be generated in the inkjet recording apparatus 10. In any case, the distance map may be generated in one of the imaging apparatus 100, the information processing apparatus, and the inkjet recording apparatus 10, before performing recording in the inkjet recording apparatus 10, and the dot layout pattern may be selected on the basis of the generated distance map.

Although each of the above-described embodiments shows an example in which an inkjet recording method is used as a recording method, the recording method is not limited thereto. As long as a recording apparatus that achieves the tones of one pixel by recording dots selected from a plurality of dots is used, the recording method of the recording apparatus is not limited, and an electrophotographic method or the like may be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-102958, filed May 24, 2017, which is hereby incorporated by reference herein in its entirety.

What is claimed is:

1. A recording control apparatus comprising:
an obtaining unit configured to obtain a photographic image captured by an imaging apparatus to be recorded and analysis information corresponding to a distance from a focus position to an object in each portion represented in the photographic image;
a recording control unit configured to execute recording of the photographic image; and
a selecting unit configured to select, on the basis of a value of each pixel of the photographic image and the analysis information, a dot layout pattern that is used to record each pixel of the photographic image and that indicates a layout of recorded dots included in dots constituting the pixel.

2. The apparatus according to claim 1, wherein
a plurality of types of dot layout patterns exist for one density of a pixel, and
the selecting unit selects, from a plurality of types of dot layout patterns of a density corresponding to a value of a pixel, a dot layout pattern that is used to record the pixel, on the basis of analysis information on a portion to which the pixel belongs.

3. The apparatus according to claim 1, wherein
the analysis information is information on a defocus amount generated on the basis of a parallax image obtained during capturing of the photographic image in the imaging apparatus.

4. The apparatus according to claim 1, wherein
the analysis information is information on a distance from a focus position to an object, the information having been generated on the basis of a parallax image obtained during capturing of the photographic image in the imaging apparatus.

5. The apparatus according to claim 1, wherein
the analysis information is provided as a distance map in which information relating to a distance is disposed in each of a plurality of blocks obtained by dividing an image.

6. The apparatus according to claim 1, wherein
the selecting unit selects the dot layout pattern on the basis of the analysis information and an optical condition for the imaging apparatus.

7. The apparatus according to claim 6, wherein
the optical condition includes at least one of a focal distance, an F values, and an object distance of the imaging apparatus.

8. The apparatus according to claim 1, comprising
a table that associates the analysis information with a dot layout pattern feature amount indicating a feature of a dot layout pattern, and
the selecting unit selects a dot layout pattern having a dot layout pattern feature amount selected by referring to the table.

9. The apparatus according to claim 8, wherein
the dot layout pattern feature amount is a probability that dots are located adjacent to each other at a predetermined coverage ratio.

10. The apparatus according to claim 8, wherein
the dot layout pattern feature amount is an amount of variations of dots in a horizontal or vertical direction at a predetermined coverage ratio.

11. The apparatus according to claim 1, wherein
the larger a blur amount determined from the analysis information is, the smaller a deviation of positions of recorded dots of the dot layout pattern selected by the selecting unit is.

12. An imaging apparatus comprising:
an image sensor including pixels including a first focus detection pixel and a second focus detection pixel;
an obtaining unit configured to obtain an image captured using the image sensor, a first focus detection signal from the first focus detection pixel, and a second focus detection signal from the second focus detection pixel;
a generation unit configured to generate, on the basis of the first and second focus detection signals, analysis information based on a distance to an object in each portion of the image captured with the image sensor; and
an output unit configured to output the image and the analysis information in association with each other.

13. An information processing apparatus comprising:
an obtaining unit configured to obtain an image captured using an image sensor including an imaging pixel in which a first focus detection pixel and a second focus detection pixel are formed in one pixel, and a parallax image associated with the captured image, the parallax image including an image obtained from the first and second focus detection pixels;
a generation unit configured to generate tone value information for causing a recording apparatus to record the image;
a calculating unit configured to calculate, on the basis of the parallax image, analysis information based on a distance to an object in each portion of the image; and
an output unit configured to output the tone value information and the analysis information to the recording apparatus.

14. A recording system including an imaging apparatus, an information processing apparatus, and a recording apparatus, the system comprising:
an imaging unit configured to capture an image in the imaging apparatus;
an obtaining unit configured to obtain a parallax image during capturing of the image in the imaging apparatus;
a generation unit configured to generate, in the information processing apparatus, tone value information for causing the recording apparatus to record the image;
a recording unit configured to execute recording of the image in the recording apparatus;
a calculating unit configured to calculate, in one of the imaging apparatus, the information processing apparatus, and the recording apparatus, analysis information based on a distance to an object in each portion of the image, on the basis of the parallax image; and
a selecting unit configured to select, in one of the information processing apparatus and the recording apparatus, a dot layout pattern that is used to record each pixel of the image on the basis of the tone value information and the analysis information during recording of the image by the recording unit and that indicates a layout of recorded dots included in dots constituting the pixel.

15. The recording system according to claim 14, wherein the information processing apparatus is included in the imaging apparatus.

16. The recording system according to claim 14, wherein the information processing apparatus is included in the recording apparatus.

17. A control method of a recording apparatus, comprising:
   obtaining a photographic image captured by an imaging apparatus to be recorded, and analysis information corresponding to a distance from a focus position to an object in each portion represented in the photographic image;
   executing recording of the photographic image by using a recording unit; and
   selecting, on the basis of a value of each pixel of the photographic image and the analysis information, a dot layout pattern that is used to record each pixel of the photographic image and that indicates a layout of recorded dots included in dots constituting the pixel.

18. The apparatus according to claim 1, wherein the analysis information is generated by the imaging apparatus.

* * * * *